US011964502B2

(12) United States Patent
Fujii

(10) Patent No.: US 11,964,502 B2
(45) Date of Patent: Apr. 23, 2024

(54) RECORDING DEVICE

(71) Applicant: SEIKO EPSON CORPORATION, Tokyo (JP)

(72) Inventor: Akina Fujii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/045,243

(22) Filed: Oct. 10, 2022

(65) Prior Publication Data

US 2023/0114709 A1 Apr. 13, 2023

(30) Foreign Application Priority Data

Oct. 11, 2021 (JP) ................................ 2021-166690

(51) Int. Cl.
*B41J 29/13* (2006.01)
*B41J 29/393* (2006.01)

(52) U.S. Cl.
CPC ............ *B41J 29/393* (2013.01); *B41J 29/13* (2013.01)

(58) Field of Classification Search
None
See application file for complete search history.

(56) References Cited

U.S. PATENT DOCUMENTS

2011/0228312 A1* 9/2011 Nakamura .......... B41J 2/17546 358/1.14
2011/0242249 A1* 10/2011 Yazawa ............... B41J 2/17566 347/108
2020/0316951 A1* 10/2020 Narazaki ............. B41J 2/16517

FOREIGN PATENT DOCUMENTS

JP 2016-215522 A 12/2016
JP 2019034428 A * 3/2019

* cited by examiner

*Primary Examiner* — Leslie J Evanisko
(74) *Attorney, Agent, or Firm* — WORKMAN NYDEGGER

(57) ABSTRACT

A recording device includes a recording unit configured to perform recording on a medium, a housing unit configured to house the recording unit and including an opening through which the recording unit is visible, an opening/closing cover configured to open and close the opening, and an illumination unit provided at a predetermined position above the recording unit and configured to illuminate an interior of the housing unit. The illumination unit is configured to move to a retracted position farther away from the recording unit than is the predetermined position, in response to the opening/closing cover being opened.

5 Claims, 12 Drawing Sheets

RECORDING DEVICE

The present application is based on, and claims priority from JP Application Serial Number 2021-166690, filed Oct. 11, 2021, the disclosure of which is hereby incorporated by reference herein in its entirety.

BACKGROUND

1. Technical Field

The present disclosure relates to a recording device.

2. Related Art

In related art, as disclosed in JP-A-2016-215522, a printer is known that includes a device main body and a stand that supports the device main body.

Inside the device main body, an image forming unit including a head and an illumination unit that illuminates the interior of the device main body are disposed. Further, on the front side of the device main body, an opening/closing cover including a transmissive window portion is provided, and the interior of the device main body is visible via the transmissive window portion.

In the printer described above, for example, when maintenance such as removing the head is performed, the maintenance is performed with the opening/closing cover displaced to be in an open state. However, when removing the head from the device main body, or when attaching the head to the device main body, the head interferes with the illumination unit. Thus, there is a problem that workability deteriorates.

Note that the problem described above is not limited to the operation of removing/attaching the head, and a similar problem can occur, for example, in an operation of removing/attaching various members at a time of maintenance.

SUMMARY

A recording device includes a recording unit configured to perform recording on a medium, a housing unit configured to house the recording unit and including an opening through which the recording unit is visible, an opening/closing cover configured to open and close the opening, and an illumination unit provided at a predetermined position above the recording unit and configured to illuminate an interior of the housing unit. The illumination unit is configured to move to a retracted position farther away from the recording unit than is the predetermined position, in response to the opening/closing cover being opened.

A recording device includes a recording unit configured to perform recording on a medium, a housing unit configured to house the recording unit and including an opening through which the recording unit is visible, an opening/closing cover configured to open and close the opening, an illumination unit provided at a predetermined position above the recording unit and configured to illuminate an interior of the housing unit, a movement mechanism configured to move the illumination unit to a retracted position farther away from the recording unit than is the predetermined position, a reception unit configured to receive an input from a user, and a control unit configured to control the movement mechanism. The control unit is configured to, based on the input, selectively control a first mode in which the illumination unit is moved from the predetermined position to the retracted position in response to the opening/closing cover being opened, and a second mode in which the illumination unit is not moved from the predetermined position in response to the opening/closing cover being opened.

DESCRIPTION OF EXEMPLARY EMBODIMENTS

1. First Embodiment

First, a configuration of a recording device 1 will be described. The recording device 1 is, for example, a large ink jet-type printer capable of performing recording (printing) on a medium M of a relatively large size such as the AO size or the B0 size of the JIS standard. The medium M is, for example, a sheet, fiber, film material, or the like.

Figure 1:
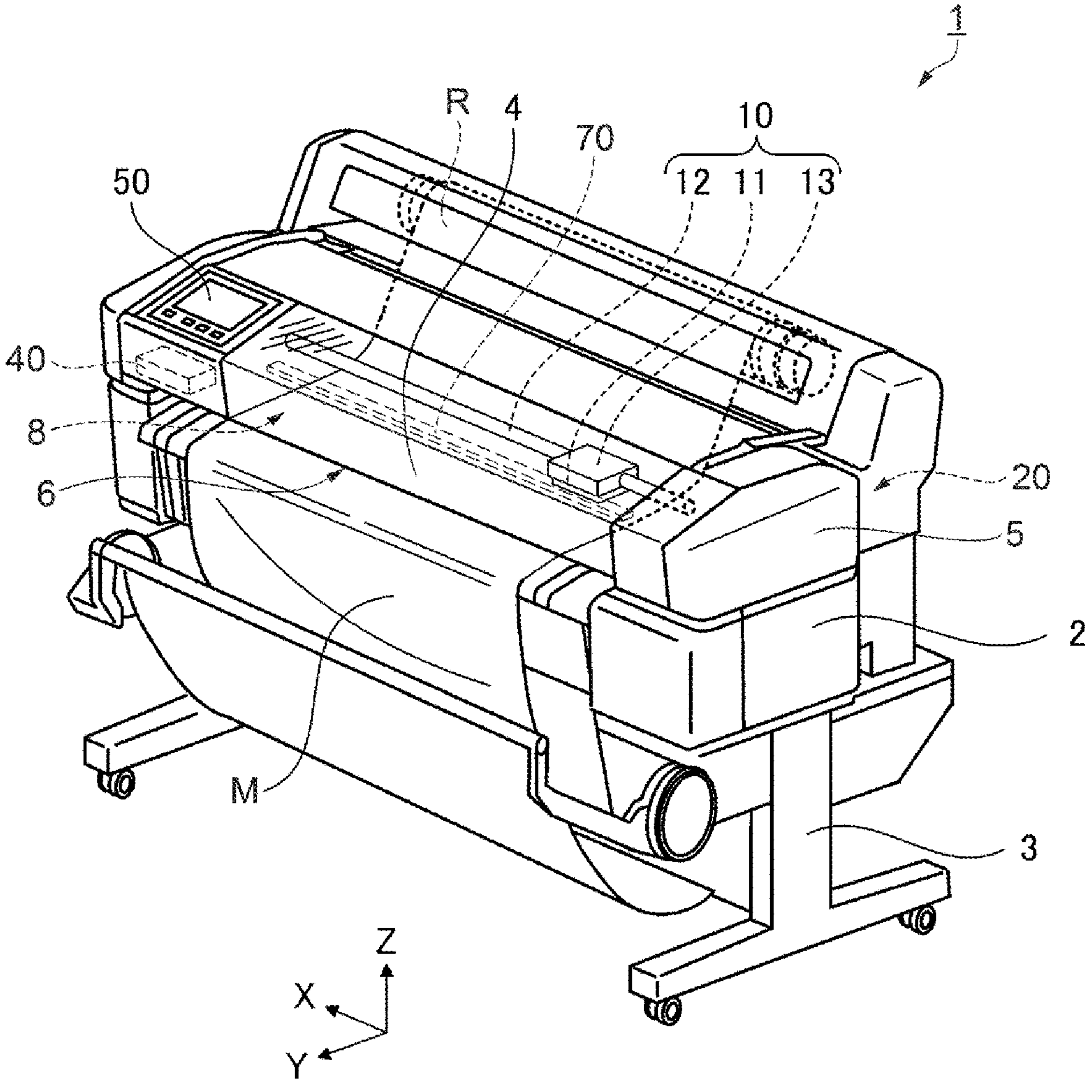
FIG. 1 is a perspective view illustrating a configuration of a recording device according to a first embodiment.
Figure 2:
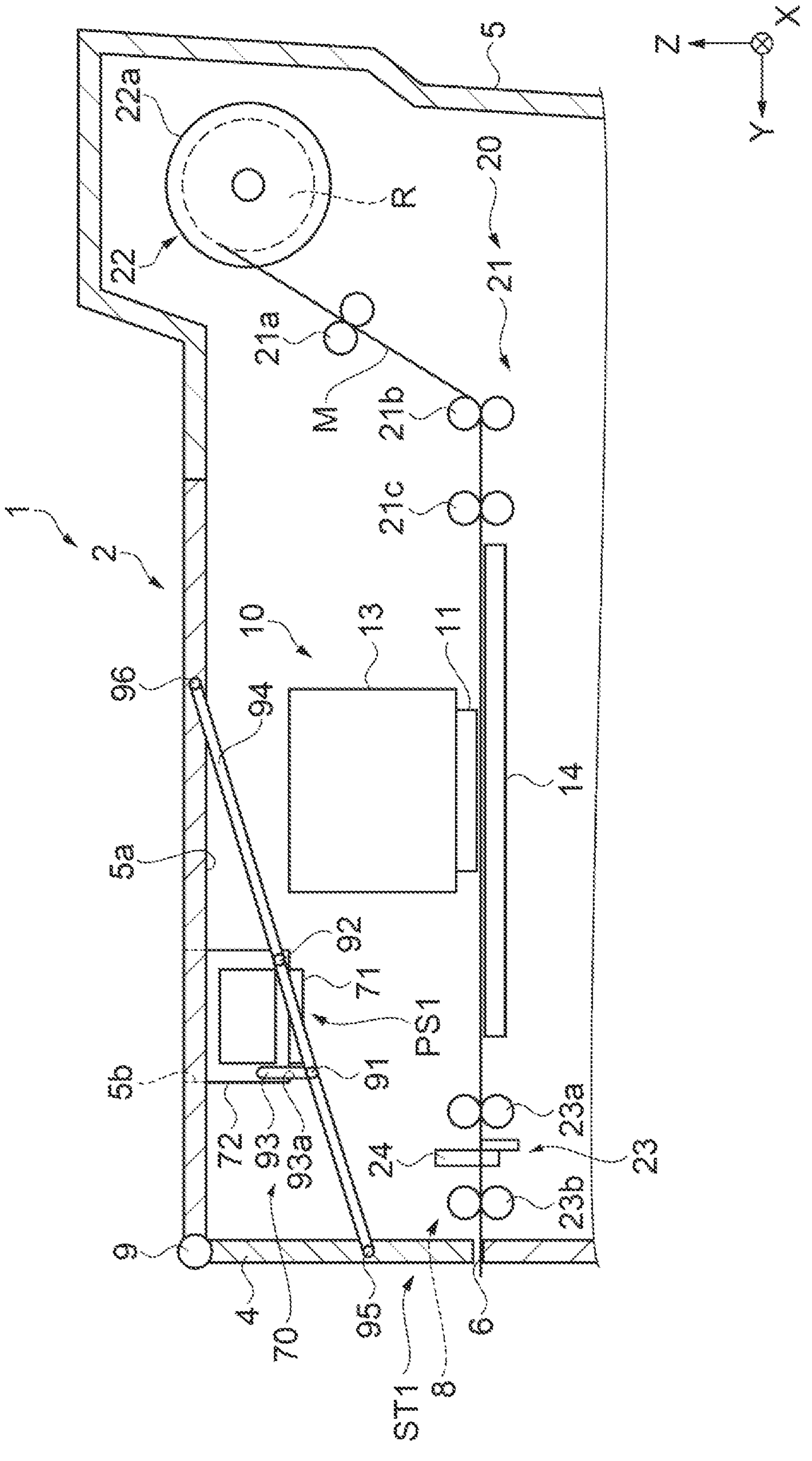
FIG. 2 is a schematic view illustrating an internal configuration of the recording device according to the first embodiment.

As illustrated in FIG. 1 and FIG. 2, the recording device 1 includes a device main body 2 and a stand 3 that supports the device main body 2. The stand 3 includes, at the lower end thereof, a plurality of casters for causing the recording device 1 to be movable on a floor surface.

The device main body 2 includes a housing unit 5. The housing unit 5 is a housing forming the exterior of the device main body 2. The housing unit 5 houses an image forming unit 10, a transport unit 20, an illumination unit 70, and the like.

The image forming unit 10 includes a head 11 as a recording unit that ejects inks in order to record (print) an image on the medium M, a guide shaft 12 provided so as to extend in a direction along an X-axis, a carriage 13 that supports the head 11 and causes the head 11 to move along the guide shaft 12 while causing the head 11 to scan the front surface of the medium M, and a platen 14 as a support portion capable of supporting the medium M. The head 11 includes a nozzle surface 11*a* in which a plurality of nozzles (not illustrated) are provided.

Note that, in this embodiment, an image is formed on the medium M fed from a roll body R around which the sheet-like medium M is wound multiple times to form a roll shape.

The platen 14 is formed of a metal material such as aluminum or SUS, for example. The platen 14 supports at least a region, of the medium M, on which the ink is ejected from the head 11 from a negative Z direction. The platen 14 includes a platen surface 14*a*. The platen surface 14*a* is a surface on which the media M is supported. In a state of supporting the medium M, the platen surface 14*a* faces the nozzle surface 11*a* with the medium M sandwiched therebetween. In other words, the platen 14 includes the platen surface 14*a* facing the nozzle surface 11*a*. The platen surface 14*a* is an example of a support surface capable of supporting the medium M.

The transport unit 20 includes a medium supply/return unit 21, a roll body storage unit 22, a discharge unit 23, and the like.

The medium supply/return unit 21 includes transport rollers 21*a*, 21*b*, and 21*c*, and supplies the medium M fed from the roll body R stored in the roll body storage unit 22 to the image forming unit 10. The medium supply/return unit 21 can also return the medium M to the roll body storage unit 22 from the image forming unit 10.

The transport rollers 21*a*, 21*b*, and 21*c* are rollers provided at a plurality of positions in order to form a transport path (path from the roll body storage unit 22 to the image forming unit 10) of the medium M, and are constituted by a driving roller, a driven roller driven by the driving roller to guide the medium M, and the like.

The roll body storage unit 22 is provided at an upper portion, on the rear side in a negative Y direction, of the device main body 2. The roll body housing 22 can store the roll body R before printing. The roll body R having various specifications (such as a material or a size) can be stored in the roll body storage unit 22.

The roll body storage unit 22 includes a pair of holders 22*a* that hold the roll body R from both sides in the axial direction thereof. Further, the roll body storage unit 22 includes a motor (not illustrated) that transmits rotational power to the holders 22*a*, and, due to driving of the motor, the roll body R held in the holders 22*a* is rotated. As a result, the medium M can be fed out or taken up.

The discharge unit 23 is provided on a positive Y direction side of the image forming unit 10. The medium M enters the image forming unit 10 from the roll body storage unit 22 via the medium supply/return unit 21, and is discharged from a discharge port 6 via the discharge unit 23 after the printing. The discharge unit 23 includes a plurality of transport rollers 23*a* and 23*b* that discharge the medium M after the printing from the image forming unit 10. The transport rollers 23*a* and 23*b* are rollers provided at a plurality of positions in order to form a discharge path of the medium M, and are constituted by the driving roller, the driven roller driven by the driving roller to guide the medium M, and the like. The discharge unit 23 of this embodiment is also provided with a cutter 24 that cuts the medium M. The medium M transported via the discharge path is discharged to the outside from the discharge port 6. The discharge port 6 is provided at an end portion in the positive Y direction of the housing unit 5.

An opening 8 is provided on the front side in the positive Y direction of the housing unit 5. The opening 8 is formed on the positive Y direction side of the image forming unit 10 in the housing unit 5. The length dimension in the direction along the X-axis of the opening 8 is a dimension corresponding to the maximum width dimension of the transportable medium M.

Further, an opening/closing cover 4 capable of opening and closing the opening 8 is provided at the device main body 2. The opening/closing cover 4 has a plate shape. The opening/closing cover 4 is formed in a rectangular shape having the longitudinal direction along the X-axis when viewed in the negative Y direction. Further, when viewed in a positive X direction, the opening/closing cover 4 is disposed in alignment with a direction along a Z-axis. A shaft 9 extending in the direction along the X-axis is disposed at an end portion on a positive Z direction side of the opening/closing cover 4. By being rotated about the shaft 9, the opening/closing cover 4 is movable between a closed state ST1 in which the opening 8 is closed and an open state ST2 (FIG. 4) in which the opening 8 is open. Specifically, in the closed state ST1, by moving an end portion on the negative Z direction side of the opening/closing cover 4 toward the positive Y direction side, the opening/closing cover 4 is rotated about the shaft 9 and caused to transition to the open state ST2. Further, in the open state ST2, by moving a tip portion, on the opposite side from the shaft 9, of the opening/closing cover 4 toward the negative Z direction side, the opening/closing cover 4 is rotated about the shaft 9 and caused to transition to the closed state ST1.

The opening/closing cover 4 includes a transmissive window portion. When the opening/closing cover 4 is in the closed state ST1, the interior of the housing unit becomes visible via the window portion. Specifically, a state of the image forming unit 10, or a state of the medium M on which an image is formed by the image forming unit 10 can be checked via the window portion. Further, by bringing the opening/closing cover 4 into the open state ST2, maintenance of the head 11 and the like inside the housing unit 5 can be performed via the opening 8.

At a predetermined position PS1 above the head 11, the illumination unit 70 that illuminates the interior of the housing unit 5 is disposed. The predetermined position PS1 at which the illumination unit 70 is disposed is a position located at an upper portion of the housing unit 5 inside the housing unit 5. Further, the predetermined position PS1 is a position located further to the positive Y direction side than the head 11. Furthermore, the predetermined position PS1 is a position at which the illumination unit 70 faces the platen 14. Specifically, the predetermined position PS1 is a position at which the illumination unit 70 faces the platen surface 14*a*. Therefore, the platen 14 faces the head 11 and the illumination unit 70 at the predetermined position PS1. As a result, the state of the medium M on which the image is formed can be easily checked.

The illumination unit 70 of this embodiment includes a light source unit 71 and a support body 72 that supports the light source unit 71. The light source unit 71 is constituted by an LED array in which a plurality of light emitting diodes (LEDs) constituted by the three RGB colors are arrayed. The light source portion 71 is disposed so as to extend in the direction along the X-axis. Then, light is irradiated downward from the light source unit 71. The illumination unit 70 is located on the same side as the head 11 with respect to the platen surface 14*a* in a Z direction.

The support body 72 is formed of a sheet metal. The support body 72 is a member for bringing the position of the light source portion 71 closer to the head 11 and the platen 14. The support body 72 is installed so as to extend in the direction along the X axis. The support body 72 is formed in a convex shape protruding in the negative Z direction with respect to a ceiling surface 5*a* provided at the upper portion of the housing unit 5. Then, the light source unit 71 is disposed at an end surface in the negative Z direction of the support body 72. As a result, the light can be irradiated from a position closer to the medium M.

Figure 3:
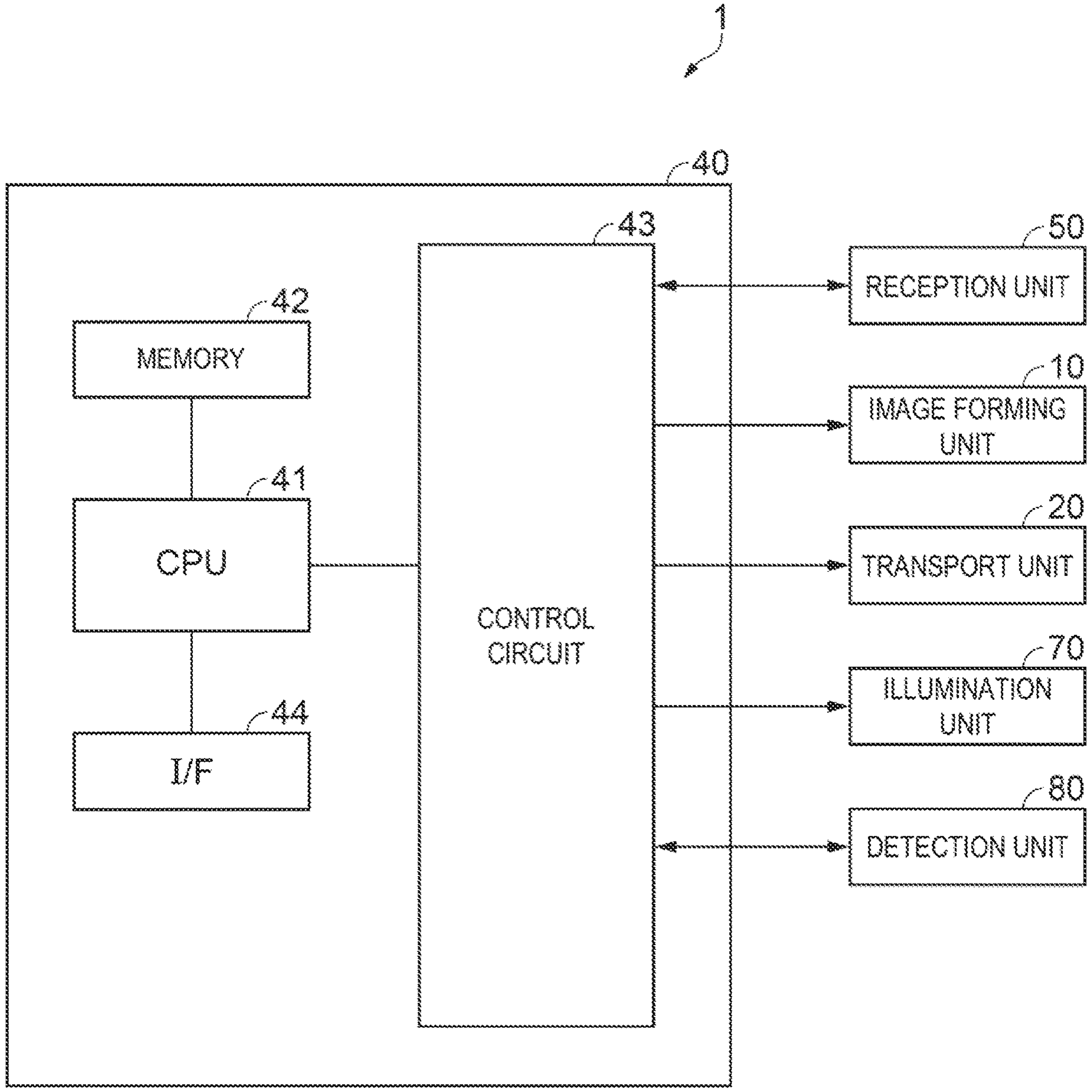
FIG. 3 is a block diagram illustrating a control configuration of the recording device according to the first embodiment.

As illustrated in FIG. 3, the recording device 1 includes a control unit 40 that controls various operations performed by the recording device 1. The control unit 40 includes, for example, a CPU 41, a memory 42, a control circuit 43, an interface (I/F) 44, and the like. The CPU 44 is an arithmetic processing device. The memory 42 is a storage device that secures a region for storing programs of the CPU 41, a working region, or the like, and includes a storage element such as a RAM or an EEPROM. For example, when recording data or the like is acquired, via the I/F 44, from the outside, namely, from an information processing terminal or the like, the CPU 41 controls each of driving portions and the like in accordance with various programs.

A reception unit 50 is an input/output unit capable of receiving an input from a user, and includes a display and an input unit. With the reception unit 50, the user can issue an instruction to the control unit 40, select an operation, and the like. Further, a detection unit 80 detects whether the opening/closing cover 4 is in the open or closed state. The detection unit 80 is, for example, a micro switch or the like. The detection unit 80 is disposed in the vicinity of the opening/closing cover 4 of the housing unit 5. Based on detection information of the detection unit 80, the control unit 40 determines whether the opening/closing cover 4 is in the open or closed state. Note that, based on the detection information of the detection unit 80, the control unit 40 determines a state in which the opening/closing cover 4 is open to be the open state. In other words, the open state detected by the detection unit 80 is a state in which a portion of the opening/closing cover 4 is separated from the housing unit 5, namely, a state in which the closed state of the opening 8 is released.

Here, in the recording device 1, when maintenance of the head 11, the carriage 13, and the like is performed, the maintenance is performed in a state in which the opening/closing cover 4 is displaced to be in the open state ST2. However, since disposed objects such as the illumination unit 70 and the like are present on the front side (positive Y direction side) of the head 11, the work efficiency deteriorates.

Further, when removing the head 11 from the housing unit 5, or when attaching the head 11 to the carriage 13 disposed inside the housing unit 5, there is a risk that the head 11 may interfere with the illumination unit 70. Furthermore, as the size of the recording device 1 increases, the size of the head 11 also increases, and the interference between the head 11 and the illumination unit 70 poses a more serious problem. Note that, during the maintenance, it is conceivable to perform the removal/attachment operation of the head 11 after moving the head 11 to a position at which the head 11 does not interfere with the illumination unit 70. However, man-hours are required for the movement of the head 11 and the like, and the work efficiency thus deteriorates.

The recording device 1 according to this embodiment is configured to be able to solve the problem described above. A specific configuration will be described below.

Figure 4:
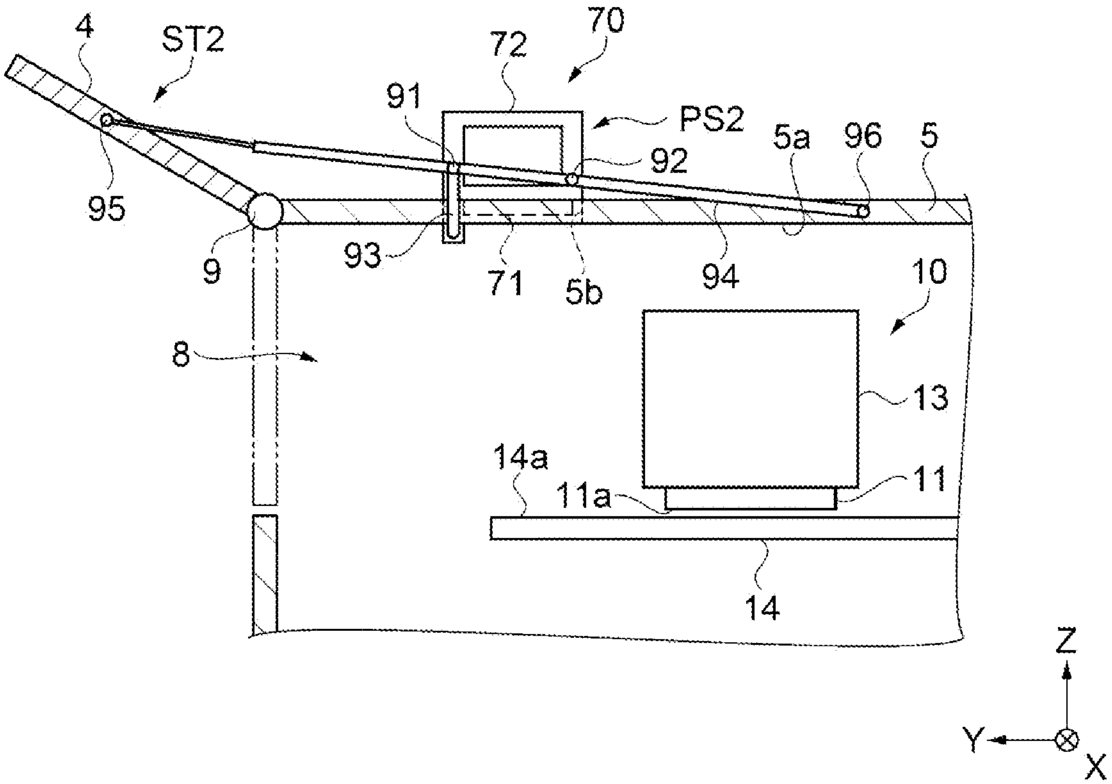
FIG. 4 is a schematic view illustrating an operation method for the recording device according to the first embodiment.

As illustrated in FIG. 2 and FIG. 4, in response to the opening/closing cover 4 being opened, the illumination unit 70 of this embodiment can move to a retracted position PS2 farther away from the head 11 than the predetermined position PS1 is. When the opening/closing cover 4 is in the closed state ST1, the illumination unit 70 is located at the predetermined position PS1 (FIG. 2). On the other hand, when the opening/closing cover 4 is in the open state ST2, the illumination unit 70 is located at the retracted position PS2 (FIG. 4).

In this embodiment, using a link mechanism, the illumination unit 70 is displaced between the predetermined position PS1 and the retracted position PS2 in conjunction with the opening/closing operation of the opening/closing cover 4. Specifically, a first shaft 91 and a second shaft 92 are provided at an end surface in a negative X direction of the support body 72 of the illumination unit 70. The first shaft 91 and the second shaft 92 extend in the direction along the X-axis. The first shaft 91 is disposed at an end portion in the positive Y direction of the support body 72, and the second shaft 92 is disposed at an end portion in the negative Y direction of the support body 72. The second axis 92 is fixed to the support body 72.

The first shaft 91 is fitted into a groove portion 93*a* formed in a guide portion 93, and is movable along the groove 93*a*. The guide portion 93 is the end surface in the negative X direction of the support body 72, and is disposed at the end portion in the positive Y direction of the support body 72. More specifically, the guide portion 93 is fixed to the support body 72 such that the groove portion 93*a* is in alignment with a direction along the Z-axis. As a result, the first shaft 91 becomes movable along the groove portion 93*a* of the guide portion 93 along the Z-axis.

The recording device 1 includes a rod-like link member 94 that couples the first shaft 91, the second shaft 92, the housing unit 5, and the opening/closing cover 4. One end of the link member 94 is coupled to the opening/closing cover 4. The one end of the link member 94 is coupled to a cover-side shaft 95 provided on the opening/closing cover 4 side. The other end of the link member 94 is coupled to the upper portion of the housing unit 5. The other end of the link member 94 is rotatable about a housing unit-side shaft 96 provided at the upper portion of the housing unit 5. The cover-side shaft 95 and the housing unit-side shaft 96 extend in the direction along the X-axis.

In a state in which the opening/closing cover 4 is in the closed state ST1 and the illumination unit 70 is located at the predetermined position PS1, the link member 94 is disposed so as to be oriented upward from the cover-side shaft 95 toward the housing unit-side shaft 96. The cover-side shaft 95, the first shaft 91, the second shaft 92, and the housing unit-side shaft 96 are disposed in this order from the lower side to the upper side. The one end of the link member 94 coupled to the cover-side shaft 95 is provided with a damper mechanism.

Further, an opening portion 5*b* is formed in a portion, of the housing unit 5, above the illumination unit 70, the first shaft 91, the second shaft 92, and the link member 94. The illumination unit 70 is supported from below by a rib provided Note that a link mechanism similar to the link mechanism described above is also provided at an end surface in the positive X direction of the support body 72 of the illumination unit 70.

By moving the end portion in the negative Z direction of the opening/closing cover 4 toward the positive Y direction side, the opening/closing cover 4 is rotated about the shaft 9 and opened. Then, in conjunction with the movement of the opening/closing cover 4 from the closed state ST1, the cover-side shaft 95 moves upward in the clockwise direction centered about the shaft 9. Further, in conjunction with the movement of the opening/closing cover 4, the link member 94 rotates about the housing unit-side shaft 96. At this time, the first shaft 91 moves upward along the groove portion 93*a*.

Then, when the opening/closing cover 4 moves (opens) further upward, the tip portion, on the opposite side to the shaft 9, of the opening/closing cover 4 moves to a position above the housing unit 5. In conjunction with the movement of the opening/closing cover 4, the first shaft 91 comes into contact with an upper end portion of the groove portion 93*a*. Further, due to the movement of the opening/closing cover 4, the link member 94 moves upward, and the link member 94 moves upward in a state of supporting the guide portion 93. Then, when the opening/closing cover 4 transitions to the open state ST2, the illumination unit 70 is located at the retracted position PS2 via the opening portion 5*b*. The retracted position PS2 is farther away from the head 11 than the predetermined position PS1 is. In this embodiment, the retracted position PS2 is a position in the positive Z direction with respect to the predetermined position PS1. The illumination unit 70 moves in a direction substantially along the Z-axis.

Note that, in this embodiment, the illumination unit 70 does not move immediately after the opening of the opening/closing cover 4 is started. Specifically, the illumination unit 70 does not move upward until the opening operation of the opening/closing cover 4 is started, and the first shaft 91 comes into contact with the upper end portion of the groove portion 93*a* of the guide portion 93. In other words, in this embodiment, after the opening operation of the opening/closing cover 4 is started, there is a time lag before the illumination unit 70 starts moving upward.

Further, the illumination unit 70 moves such that, as well as facing the platen 14 at the predetermined position PS1, the illumination unit 70 faces the platen 14 at the retracted position PS2. In other words, at the retracted position PS2, illumination light from the illumination unit 70 reaches the platen 14. At the retracted position PS2, the illumination unit 70 is located at the separated position from the platen 14, but the light is irradiated from the illumination unit 70 toward the platen 14. Thus, compared to a case in which the illumination light from the illumination unit 70 does not reach the platen 14, a significant reduction, in the vicinity of the head 11, in the amount of light from the illumination unit 70 is suppressed.

In this embodiment, in conjunction with the opening/closing cover 4 being opened, the illumination unit 70 moves in a direction away from the head 11. As a result, the illumination unit 70 is retracted from the head 11. Thus, a large space can be secured on the positive Y direction side of the head 11, and the interference between the head 11 and the like and the illumination unit 70, and also a deterioration in the workability can be suppressed when performing, via the opening 8, the maintenance of the head 11 and the like or the operation of removing and attaching the head 11 and the like with respect to the housing unit 5.

Further, when the head 11 is removed from and attached to the interior of the housing unit 5, it is not necessary to move the head 11 to a position at which the head 11 does not interfere with the illumination unit 70, and the work efficiency is thus improved.

Further, a visible range of the user during the maintenance is expanded, and maintainability is thus improved.

Next, a control method for the recording device 1 will be described.

Specifically, a control method for the illumination unit 70 associated with the operation of the opening/closing cover 4 will be described.

Figure 5:
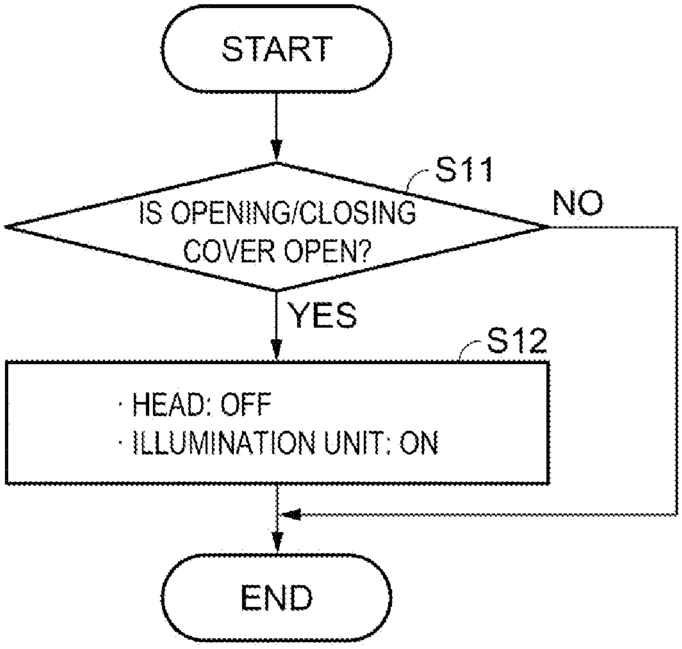
FIG. 5 is a flowchart illustrating a control method for the recording device according to the first embodiment.

As illustrated in FIG. 5, first, at step S11, the control unit 40 determines whether or not the opening/closing cover 4 has been opened. Specifically, based on the detection information of the detection unit 80, the control unit 40 determines whether or not the opening/closing cover 4 is in the open state.

Then, when the control unit 40 determines that the opening/closing cover 4 has been opened (YES), the control unit 40 proceeds to step S12, and when the control unit 40 determines that the opening/closing cover 4 has not been opened, namely, the opening/closing cover 4 is in the closed state ST1 (NO), the control unit 40A proceeds to END.

When the control unit 40 proceeds to step S12, the control unit 40 stops the operation of the head 11 (image forming unit 10), and causes the illumination unit 70 to operate (illuminate). Note that a timing at which the operation of the head 11 is stopped and a timing at which the operation of the illumination unit 70 is started may be the same timing, or the operation of the illumination unit 70 may be started after the operation of the head 11 is stopped. Note that when the illumination unit 70 is performing the illumination operation at step S11, the illumination operation is continued. In this way, a deterioration in the workability of the maintenance with respect to the head 11, which is caused by the continuing operation of the head 11, can be suppressed, and at the same time, the illumination light from the illumination unit 70 can be utilized as the illumination light during the maintenance operation.

Further, at step S12, the control unit 40 increases the output of the illumination unit 70. In other words, when the illumination unit 70 moves in response to the opening/closing cover 4 being opened, the output of the illumination unit 70 is increased to be greater than the output of the illumination unit 70 at the predetermined position PS1. As a result, a reduction in the amount of light caused by the illumination unit 70 moving in the direction away from the head 11 can be suppressed. Note that, in this embodiment, "in response to being opened" refers to a state in which the illumination unit 70 starts moving after the time lag from when the opening operation of the opening/closing cover 4 is started. However, "in response to being opened" may also refer to a state in which the illumination unit 70 starts moving at the same time as the opening/closing cover 4 is opened.

2. Second Embodiment

Next, a second embodiment will be described. Note that configurations identical to those in the first embodiment will be denoted by the same reference signs and redundant descriptions will be omitted.

Figure 6A:
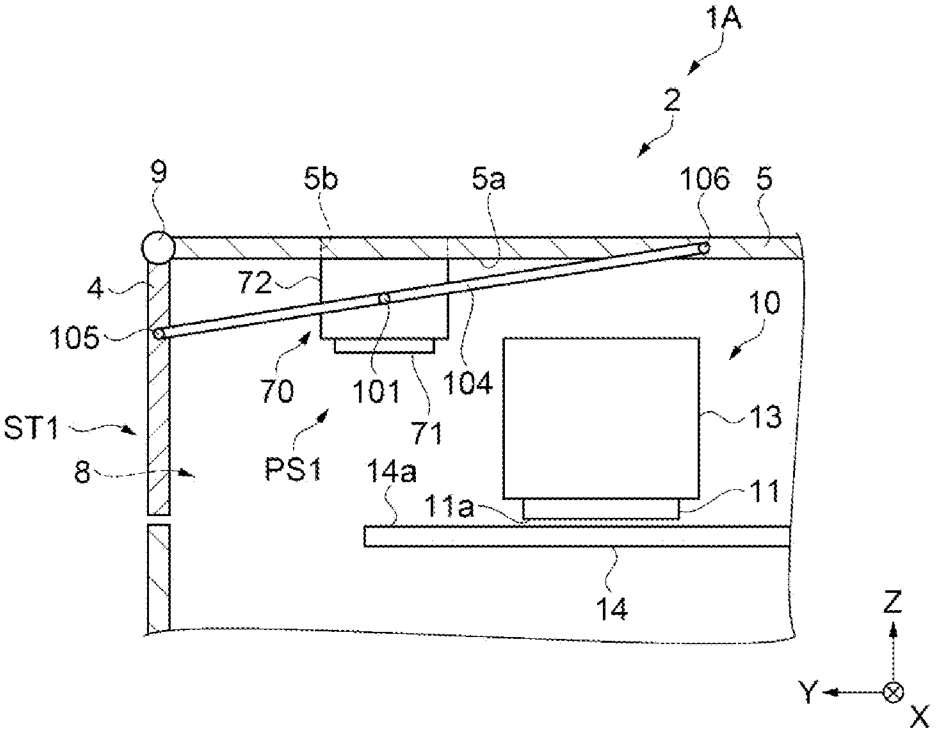
FIG. 6A is a schematic view illustrating a partial configuration of a recording device according to a second embodiment.
Figure 6B:
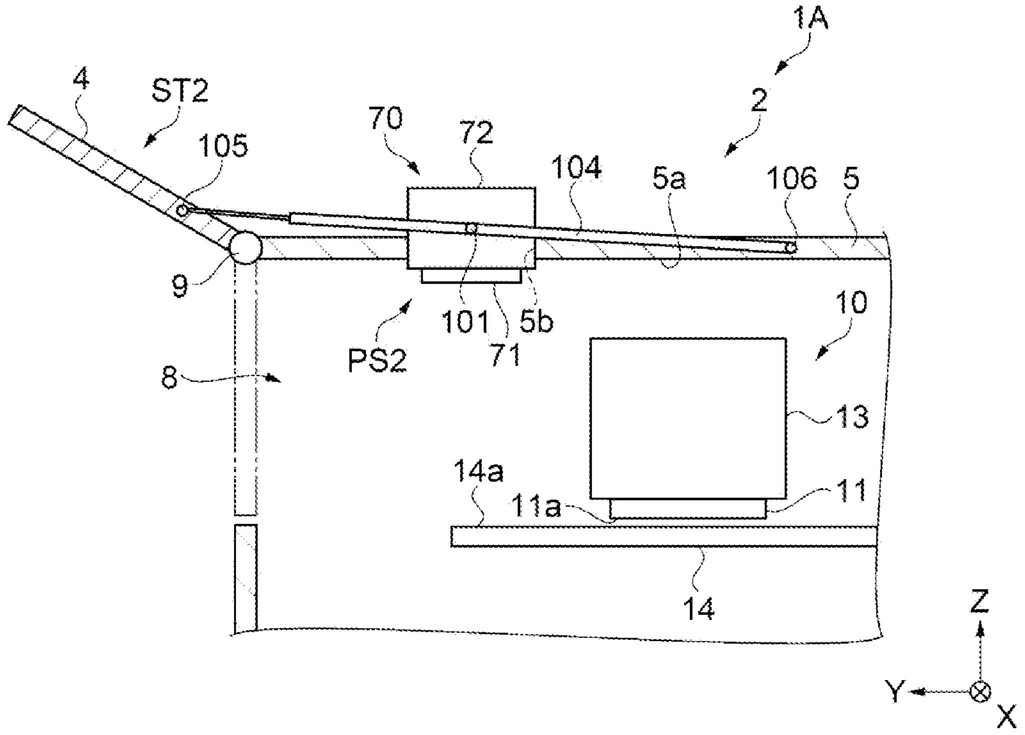
FIG. 6B is a schematic view illustrating an operation method for the recording device according to the second embodiment.

As illustrated in FIG. 6A and FIG. 6B, the illumination unit 70 of a recording device 1A according to this embodiment can move to the retracted position PS2 farther away from the head 11 than the predetermined position PS1 is, in response to the opening/closing cover 4 being opened. When the opening/closing cover 4 is in the closed state ST1, the illumination unit 70 is located at the predetermined position PS1 (FIG. 6A). On the other hand, when the opening/closing cover 4 is in the closed state ST2, the illumination unit 70 is located at the retracted position PS2 (FIG. 6B). The definition of the predetermined position PS1 is the same as that of the first embodiment.

In this embodiment, using a link mechanism, the illumination unit 70 is displaced between the predetermined position PS1 and the retracted position PS2 in conjunction with the opening/closing operation of the opening/closing cover 4. Specifically, a first shaft 101 is provided at the end surface in the negative X direction of the support body 72 of the illumination unit 70, The first shaft 101 extends in the direction along the X-axis. The first shaft 101 is disposed in a central portion, in a direction along a Y-axis, of the support body 72. The first shaft 101 is fixed to the support body 72.

The recording device 1A includes a rod-like link member 104 that couples the first shaft 101, the housing unit 5, and the opening/closing cover 4. One end of the link member 104 is coupled to the opening/closing cover 4. The one end of the link member 104 is coupled to a cover-side shaft 105 provided on the opening/closing cover 4 side. The other end of the link member 104 is coupled to the upper portion of the housing unit 5. The other end of the link member 104 is rotatable about a housing unit-side shaft 106 provided at the upper portion of the housing unit 5. The cover-side shaft 105 and the housing unit-side shaft 106 extend in the direction along the X-axis.

In the state in which the opening/closing cover 4 is in the closed state ST1 and the illumination unit 70 is located at the predetermined position PS1, the link member 104 is disposed so as to be oriented upward from the cover-side shaft 105 toward the housing unit-side shaft 106. The cover-side shaft 105, the first shaft 101, and the housing unit-side shaft 106 are disposed in this order from the lower side to the upper side. Note that the one end of the link member 104 coupled to the cover-side shaft 105 is provided with a damper mechanism.

Further, the opening portion 5*b* is formed in a portion, of the housing unit 5, above the illumination unit 70, the first shaft 101, and the link member 104. The illumination unit 70 is supported from below by the rib provided inside the housing unit 5.

Note that a link mechanism similar to the link mechanism described above is also provided at the end surface in the positive X direction of the support body 72 of the illumination unit 70.

By moving the end portion in the negative Z direction of the opening/closing cover 4 toward the positive Y direction side, the opening/closing cover 4 is rotated about the shaft 9 and opened. In conjunction with the opening/closing cover 4 being opened, the cover-side shaft 105 moves upward in the clockwise direction centered about the shaft 9. Then, the link member 104 rotates about the housing unit-side shaft 106. The first shaft 101 moves upward in conjunction with the upward movement of the link member 104. As a result, the illumination unit 70 moves upward. Then, when the opening/closing cover 4 transitions to the open state ST2, the illumination unit 70 is located at the retracted position PS2. The retracted position PS2 is farther away from the head 11 than the predetermined position PS1 is. In this embodiment, the retracted position PS2 is a position in the positive Z direction with respect to the predetermined position PS1. The illumination unit 70 moves in a direction substantially along the Z-axis.

Note that, in this embodiment, the illumination unit 70 moves in synchronization with the opening operation of the opening/closing cover 4.

Further, the illumination unit 70 moves such that, as well as facing the platen 14 at the predetermined position PS1, the illumination unit 70 faces the platen 14 at the retracted position PS2. Although, at the retracted position PS2, the illumination unit 70 is located at the separated position, the light is irradiated from the illumination unit 70 toward the platen 14, and thus a significant reduction, in the vicinity of the head 11, in the amount of light from the illumination unit 70 is suppressed.

As described above, according to this embodiment, in addition to the effect of the first embodiment, the illumination unit 70 can be moved with a simple configuration.

Note that, similarly to the first embodiment, the control of the illumination unit 70 associated with the operation of the opening/closing cover 4 may be performed.

3. Third Embodiment

Next, a third embodiment will be described. Note that configurations identical to those in the first embodiment will be denoted by the same reference signs and redundant descriptions will be omitted.

Figure 7A:
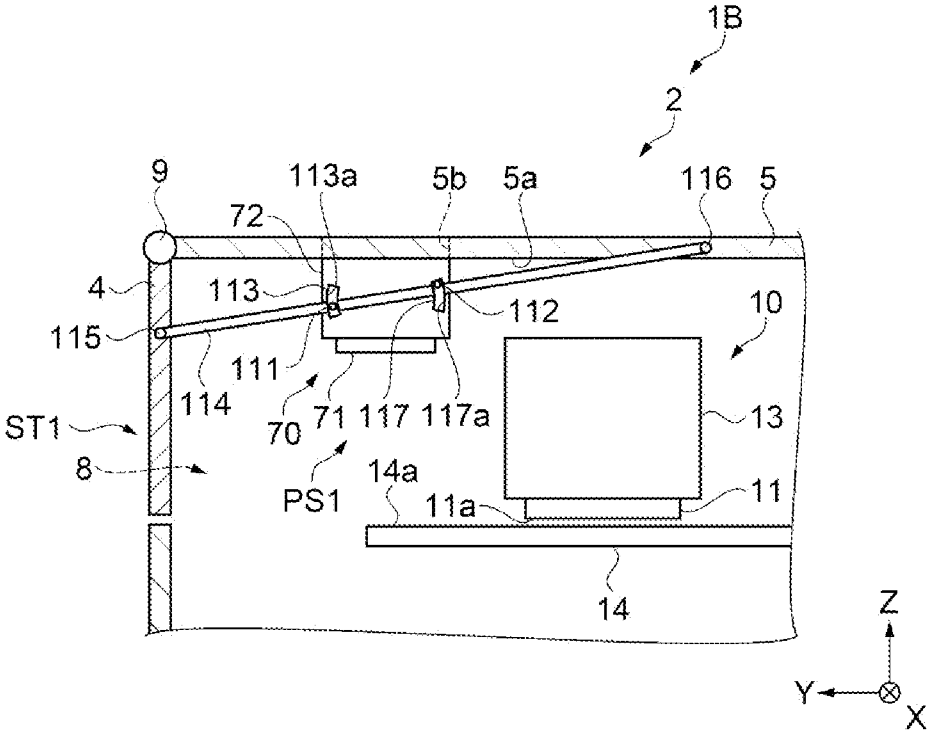
FIG. 7A is a schematic view illustrating a partial configuration of a recording device according to a third embodiment.
Figure 7B:
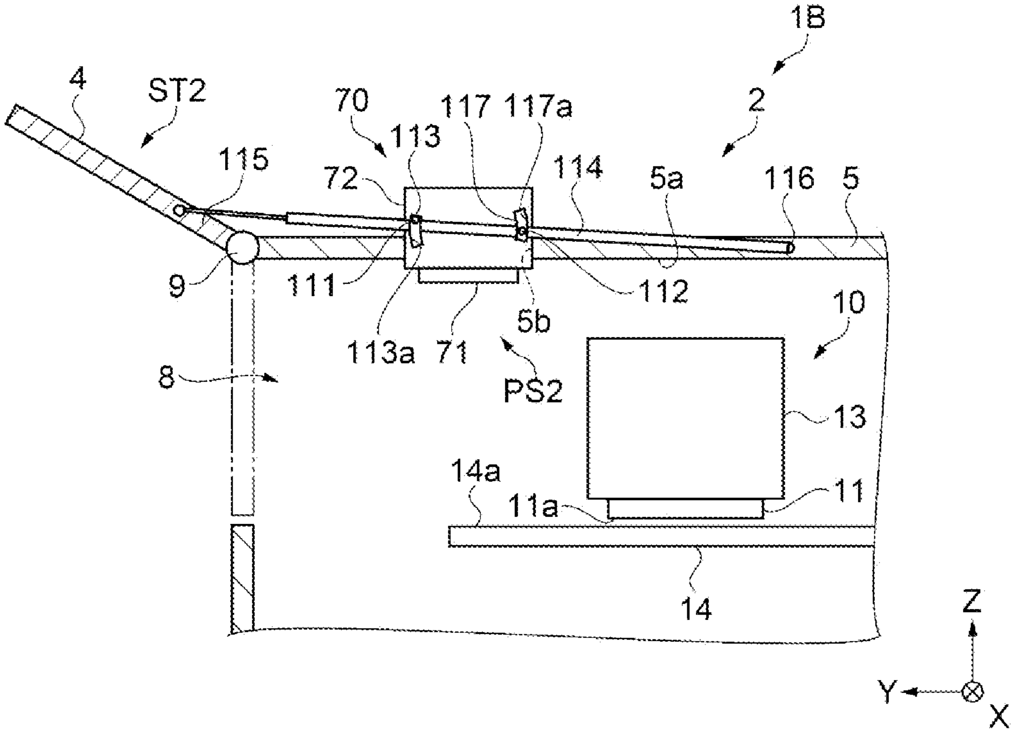
FIG. 7B is a schematic view illustrating an operation method for the recording device according to the third embodiment.

As illustrated in FIG. 7A and FIG. 7B, the illumination unit 70 of a recording device 1B according to this embodiment can move to the retracted position PS2 farther away from the head 11 than the predetermined position PS1 is, in response to the opening/closing cover 4 being opened. When the opening/closing cover 4 is in the closed state ST1, the illumination unit 70 is located at the predetermined position PS1 (FIG. 7A). On the other hand, when the opening/closing cover 4 is in the closed state ST2, the illumination unit 70 is located at the retracted position PS2 (FIG. 7B). The definition of the predetermined position PS1 is the same as that of the first embodiment.

In this embodiment, using a link mechanism, the illumination unit 70 is displaced between the predetermined position PS1 and the retracted position PS2 in conjunction with the opening/closing operation of the opening/closing cover 4. Specifically, a first shaft 111 and a second shaft 112 are provided at the end surface in the negative X direction of the support body 72 of the illumination unit 70. The first shaft 111 and the second shaft 112 extend in the direction along the X-axis. The first shaft 111 is disposed at the end portion in the positive Y direction of the support body 72, and the second shaft 112 is disposed at the end portion in the negative Y direction of the support body 72.

The first shaft 111 is fitted into a first groove portion 113*a* formed in a first guide portion 113, and is movable along the first groove portion 113*a*. The guide portion 113 is the end surface in the negative X direction of the support body 72, and is disposed at the end portion in the positive Y direction of the support body 72. The first groove portion 113*a* is formed in a curved shape protruding in the positive Y direction. The first shaft 111 is movable along the first groove portion 113*a* of the first guide portion 113.

The second shaft 112 is fitted into a second groove portion 117*a* formed in a second guide portion 117, and is movable along the second groove portion 117*a*. The second guide portion 117 is the end surface in the negative X direction of the support body 72, and is disposed at the end portion in the positive Y direction of the support body 72. The second groove portion 117*a* is formed in a curved shape protruding in the negative Y direction. The second shaft 112 is movable along the second groove portion 117*a* of the second guide portion 117.

The recording device 1B includes the first shaft 111, the second shaft 112, and a rod-like link member 114 that couples the housing unit 5 and the opening/closing cover 4. One end of the link member 114 is coupled to the opening/closing cover 4. The one end of the link member 114 is coupled to a cover-side shaft 115 provided on the opening/closing cover 4 side. The other end of the link member 114 is coupled to the upper portion of the housing unit 5. The other end of the link member 104 is rotatable about a housing unit-side shaft 116 provided at the upper portion of the housing unit 5. The cover-side shaft 115 and the housing unit-side shaft 116 extend in the direction along the X-axis.

In the state in which the opening/closing cover 4 is in the closed state ST1 and the illumination unit 70 is located at the predetermined position PS1, the link member 114 is disposed so as to be oriented upward from the cover-side shaft 115 toward the housing unit-side shaft 116. The cover side shaft 115, the first shaft 111, the second shaft 112, and the housing unit-side shaft 116 are disposed in this order upward from the lower side to the upper side. Further, in the state in which the opening/closing cover 4 is the closed state ST1 and the illumination unit 70 is positioned at the predetermined position PS1, the first shaft 111 comes into contact with an end portion in the negative Z direction of the first groove portion 113*a*, and the second shaft 112 comes into contact with an end portion in the positive Z direction of the second groove portion 117*a*. Note that the one end of the link member 114 coupled to the cover-side shaft 115 is provided with a damper mechanism. Further, the opening portion 5*b* is formed in a portion, of the housing unit 5, above the illumination unit 70, the first shaft 111, the second shaft 112, and the link member 114. The illumination unit 70 is supported from below by the rib provided inside the housing unit 5.

Note that a link mechanism similar to the link mechanism described above is also provided at the end surface in the positive X direction of the support body 72 of the illumination unit 70.

By moving the end portion in the negative Z direction of the opening/closing cover 4 toward the positive Y direction side, the opening/closing cover 4 is rotated about the shaft 9 and opened. In conjunction with the opening/closing cover 4 being opened, the cover-side shaft 115 moves upward in the clockwise direction centered about the shaft 9. Then, the link member 114 rotates about the housing unit-side shaft 116.

Subsequently, when the opening/closing cover 4 moves further upward, the tip portion, on the opposite side to the shaft 9, of the opening/closing cover 4 moves to a position above the housing unit 5. In conjunction with the movement of the opening/closing cover 4, the first shaft 111 comes into contact with an upper end portion of the first groove portion 113*a*. Further, due to the movement of the opening/closing cover 4, the link member 114 moves upward, and the link member 114 moves upward in a state of supporting the first guide portion 113. At this time, the second shaft 112 moves downward along the second groove portion 117*a*. Then, when the opening/closing cover 4 transitions to the open state ST2, the illumination unit 70 is located at the retracted position PS2. The retracted position PS2 is farther away from the head 11 than the predetermined position PS1 is. In this embodiment, the retracted position PS2 is the position in the positive Z direction with respect to the predetermined position PS1. The illumination unit 70 moves in a direction substantially along the Z-axis.

Note that, in this embodiment, the illumination unit 70 does not move immediately after the opening of the opening/closing cover 4 is started. Specifically, the illumination unit 70 does not move upward until the opening operation of the opening/closing cover 4 is started, and the first shaft 111 comes into contact with the upper end portion of the first groove portion 113*a* of the first guide portion 113. In other words, in this embodiment, after the opening operation of the opening/closing cover 4 is started, there is a time lag before the illumination unit 70 starts moving upward.

Further, the illumination unit 70 moves such that, as well as facing the platen 14 at the predetermined position PS1, the illumination unit 70 faces the platen 14 at the retracted position PS2. Although, at the retracted position PS2, the illumination unit 70 is located at the separated position, the light is irradiated from the illumination unit 70 toward the platen 14, and thus a significant reduction, in the vicinity of the head 11, in the amount of light from the illumination unit 70 is suppressed.

According to this embodiment, the same effect as described above can be obtained.

Note that, similarly to the first embodiment, the control of the illumination unit 70 associated with the operation of the opening/closing cover 4 may be performed.

4. Fourth Embodiment

Next, a fourth embodiment will be described. Note that configurations identical to those in the first embodiment will be denoted by the same reference signs and redundant descriptions will be omitted.

Figure 8A:
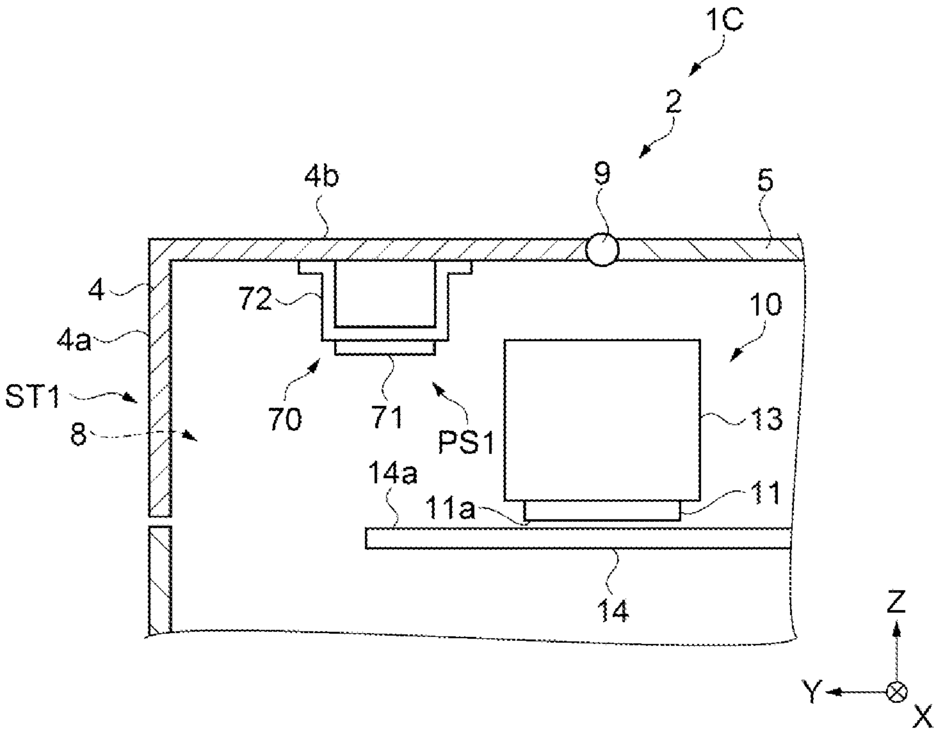
FIG. 8A is a schematic view illustrating a partial configuration of a recording device according to a fourth embodiment.
Figure 8B:
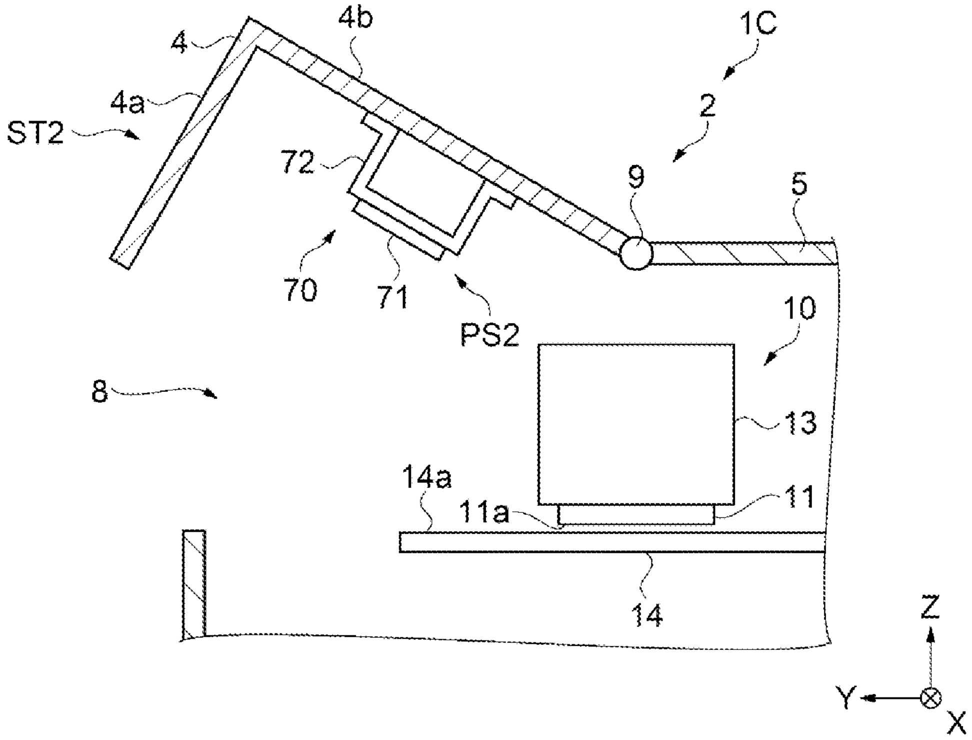
FIG. 8B is a schematic view illustrating an operation method for the recording device according to the fourth embodiment.

As illustrated in FIG. 8A and FIG. 8B, in a recording device 1C of this embodiment, the opening 8 is provided on the front side in the positive Y side of the housing unit 5. The opening 8 is formed in the housing unit 5 on the positive Y direction side and the positive Z direction side of the image forming unit 10. The length dimension in the direction along the X-axis of the opening 8 is a dimension corresponding to the maximum width dimension of the transportable medium M.

Further, the opening/closing cover 4 capable of opening and closing the opening 8 is provided at the device main body 2. The opening/closing cover 4 includes a cover front surface portion 4*a* corresponding to the positive Y direction side of the image forming unit 10, and a cover upper surface portion 4*b* coupled to an end portion in the positive Z direction of the cover front surface portion 4*a* and corresponding to the positive Z direction side of the image forming unit 10. The shaft 9 extending in the direction along the X-axis is disposed at an end portion in the negative Y direction of the cover upper surface portion 4*b*, and the opening/closing cover 4 is rotatable about the shaft 9. As a result, the opening/closing cover 4 can be opened and closed with respect to the opening 8.

The opening/closing cover 4 includes the transmissive window portion. When the opening/closing cover 4 is in the closed state ST1, the interior of the housing unit becomes visible via the window portion. Specifically, a state of the image forming unit 10, or a state of the medium M on which an image is formed by the image forming unit 10 can be checked via the window portion. Further, by bringing the opening/closing cover 4 into the open state ST2, maintenance of the head 11 and the like inside the housing unit 5 can be performed via the opening 8.

At a predetermined position PS1 above the head 11, the illumination unit 70 that illuminates the interior of the housing unit 5 is disposed. The illumination unit 70 of this embodiment is disposed at the opening/closing cover 4. More specifically, the illumination unit 70 is disposed at an end surface in the negative Z direction of the cover upper surface portion 4*b*. Further, the illumination unit 70 is disposed on the positive Y direction side of the head 11. In other words, the platen 14 faces the head 11 and the illumination unit 70 at the predetermined position PS1. As a result, the state of the medium M on which the image is formed can be easily checked.

The illumination unit 70 of this embodiment includes the light source unit 71 and the support body 72 that supports the light source unit 71. The support body 72 is formed of a sheet metal. The support body 72 is disposed at the end surface in the negative Z direction of the cover upper surface portion 4*b*. The support body 72 is installed so as to extend in the direction along the X axis. The support body 72 is formed so as to have a convex shape protruding in the negative Z direction with respect to the end surface in the negative Z direction of the cover upper surface portion 4*b*. Then, the light source unit 71 is disposed at an end surface in the negative Z direction of the support body 72. As a result, the state of an entire printing region of the medium M can be easily checked.

The illumination unit 70 of the recording device 1C according to this embodiment can move to the retracted position PS2 farther away from the head 11 than the predetermined position PS1 is, in response to the opening/closing cover 4 being opened. When the opening/closing cover 4 is in the closed state ST1, the illumination unit 70 is located at the predetermined position PS1 (FIG. 8A). On the other hand, when the opening/closing cover 4 is in the closed state ST2, the illumination unit 70 is located at the retracted position PS2 (FIG. 8B). The definition of the predetermined position PS1 is the same as that of the first embodiment.

By moving upward the end portion in the negative Z direction of the opening/closing cover 4 (cover front surface portion 4*a*), the opening/closing cover 4 is rotated about the shaft 9 and opened. In conjunction with the opening/closing cover 4 being opened, the illumination unit 70 is rotated about the shaft 9 and moves upward. Then, when the opening/closing cover 4 transitions to the open state ST2, the illumination unit 70 is located at the retracted position PS2. The retracted position PS2 is farther away from the head 11 than the predetermined position PS1 is. In this embodiment, the retracted position PS2 is located in the positive Z direction with respect to the predetermined position PS1. In this embodiment, the illumination unit 70 rotationally moves about the shaft 9 from the predetermined position PS1 to the retracted position PS2. Further, in this embodiment, the illumination unit 70 moves in synchronization with the opening operation of the opening/closing cover 4.

As described above, according to this embodiment, an interlocking mechanism between the opening/closing cover 4 and the illumination unit 70 can be realized with an easy configuration without using a link mechanism.

Note that, similarly to the first embodiment, the control of the illumination unit 70 associated with the operation of the opening/closing cover 4 may be performed.

5. Fifth Embodiment

Next, a fifth embodiment will be described. Note that configurations identical to those in the first embodiment will be denoted by the same reference signs and redundant descriptions will be omitted.

Figure 9A:
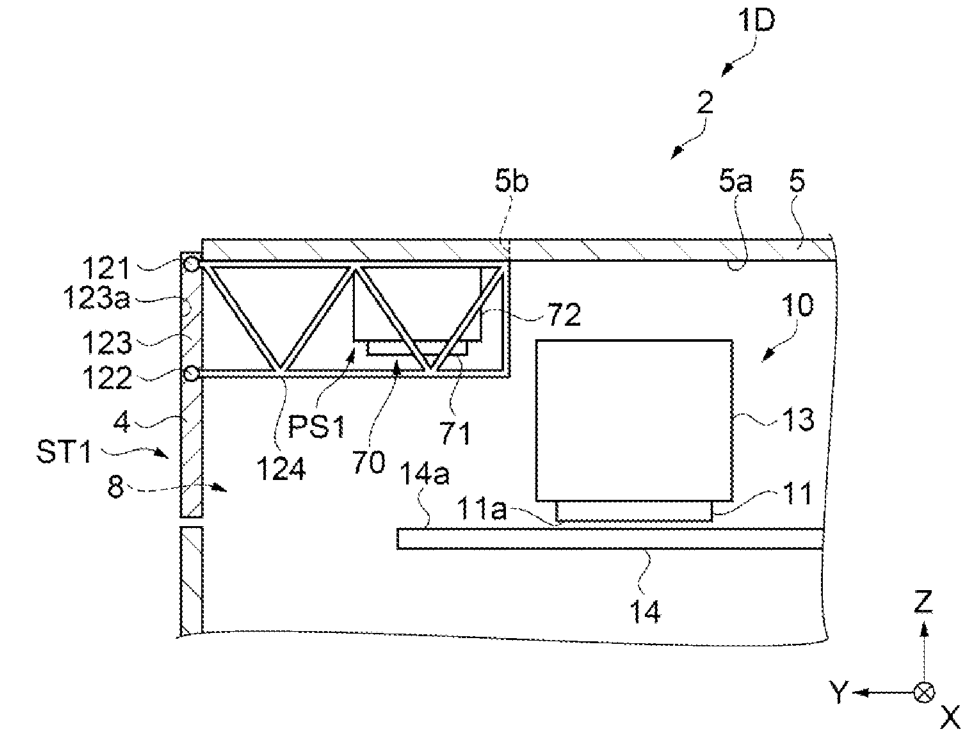
FIG. 9A is a schematic view illustrating a partial configuration of a recording device according to a fifth embodiment.
Figure 9B:
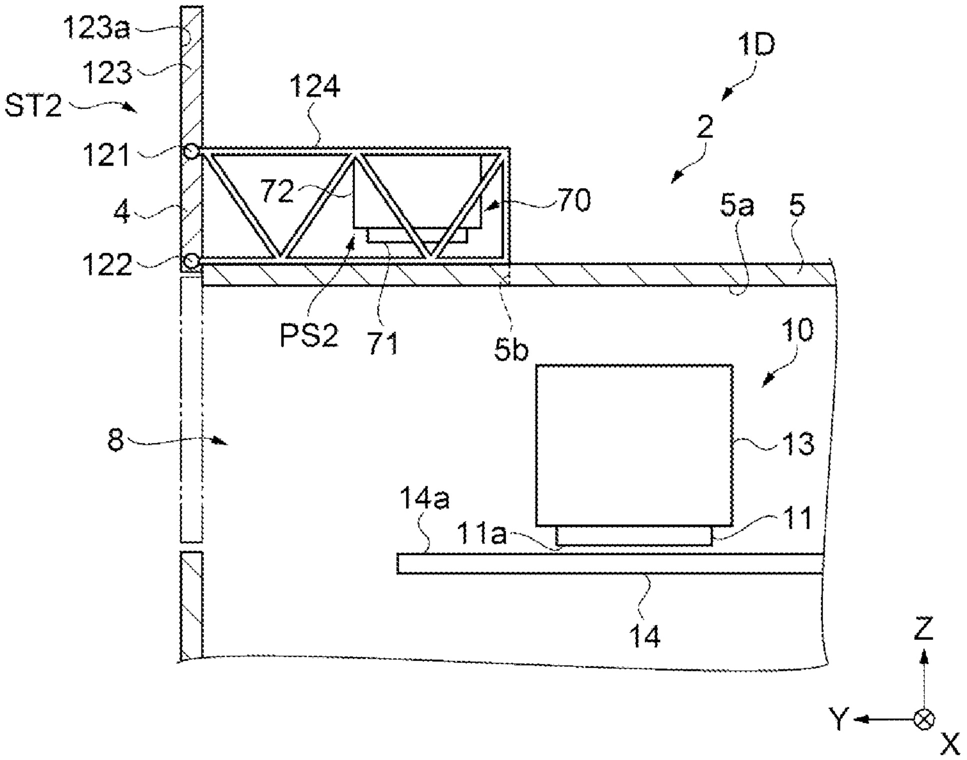
FIG. 9B is a schematic view illustrating an operation method for the recording device according to the fifth embodiment.

As illustrated in FIG. 9A and FIG. 9B, the illumination unit 70 of a recording device 1D according to this embodiment can move to the retracted position PS2 farther away from the head 11 than the predetermined position PS1 is, in response to the opening/closing cover 4 being opened. When the opening/closing cover 4 is in the closed state ST1, the illumination unit 70 is located at the predetermined position PS1 (FIG. 9A). On the other hand, when the opening/closing cover 4 is in the closed state ST2, the illumination unit 70 is located at the retracted position PS2 (FIG. 9B). The opening/closing cover 4 of this embodiment is movable in the direction along the Z-axis. The definition of the predetermined position PS1 is the same as that of the first embodiment.

In this embodiment, the illumination unit 70 is displaced between the predetermined position PS1 and the retracted position PS2 in conjunction with the opening/closing operation of the opening/closing cover 4. Specifically, a first shaft 121 and a second shaft 122 are provided at an end surface in the negative X direction of the opening/closing cover 4. The first shaft 121 and the second shaft 122 extend in the direction along the X-axis. The first shaft 121 and the second shaft 122 are disposed spaced apart at a predetermined interval in the direction along the Z-axis. The first shaft 121 is disposed in the positive Z direction with respect to the second shaft 122.

The first shaft 121 and the second shaft 122 are fitted into a groove portion 123*a* formed in a guide portion 123. The groove portion 123*a* is formed in the direction along the Z-axis. The first shaft 121 and the second shaft 122 are movable along the groove portion 123*a* in the state of being spaced apart at the predetermined interval.

Note that the first shaft 121 and the second shaft 122 are also provided at an end surface in the positive X direction of the opening/closing cover 4.

In the recording device 1D, a coupling unit 124 is provided that is coupled to the first shaft 121 and the second shaft 122. The coupling unit 124 is a frame body with beams disposed therein forming a lattice shape. The coupling unit 124 supports the illumination unit 70. Note that, in this embodiment, a lower portion of the coupling unit 124 is supported by the rib provided inside the housing unit 5.

Further, the opening portion 5*b* is formed in a portion, of the housing unit 5, above the illumination unit 70 and the coupling unit 124.

By moving the opening/closing cover 4 in the positive Z direction, the opening/closing cover 4 moves upward and is opened. While the opening/closing cover 4 is moving upward, the first shaft 121 and the second shaft 122 do not move, and the illumination unit 70 is maintained at the predetermined position PS1.

Then, when the opening/closing cover 4 moves further upward, the second shaft 122 comes into contact with an end portion in the negative Z direction of the groove portion 123*a*, and the illumination unit 70 moves upward together with the coupling unit 124. Then, when the opening/closing cover 4 transitions to the open state ST2, the illumination unit 70 is located at the retracted position PS2. The retracted position PS2 is a position located further away from the head 11 than the predetermined position PS1. In this embodiment, the retracted position PS2 is located in the positive Z direction with respect to the predetermined position PS1. In other words, the illumination unit 70 moves on a substantially straight line in the direction along the Z-axis. The opening/closing cover 4 of this embodiment is provided with a balancer, and the opening/closing cover 4 is held in the open state ST2.

Note that, in this embodiment, the illumination unit 70 does not move immediately after the opening of the opening/closing cover 4 is started. Specifically, the illumination unit 70 does not move upward until the opening operation of the opening/closing cover 4 is started, and the second shaft 122 comes into contact with an lower end portion of the groove portion 123*a* of the guide portion 123. In other words, in this embodiment, after the opening operation of the opening/closing cover 4 is started, there is a time lag before the illumination unit 70 starts moving upward.

Further, the illumination unit 70 moves such that, as well as facing the platen 14 at the predetermined position PS1, the illumination unit 70 faces the platen 14 at the retracted position PS2. Although, at the retracted position PS2, the illumination unit 70 is located at the separated position, the light is irradiated from the illumination unit 70 toward the platen 14, and thus a significant reduction, in the vicinity of the head 11, in the amount of light from the illumination unit 70 is suppressed.

According to this embodiment, the same effect as described above can be obtained.

Note that, similarly to the first embodiment, the control of the illumination unit 70 associated with the operation of the opening/closing cover 4 may be performed.

6. Sixth Exemplary Embodiment

Next, a sixth embodiment will be described. Note that configurations identical to those in the first embodiment will be denoted by the same reference signs and redundant descriptions will be omitted.

Figure 10A:
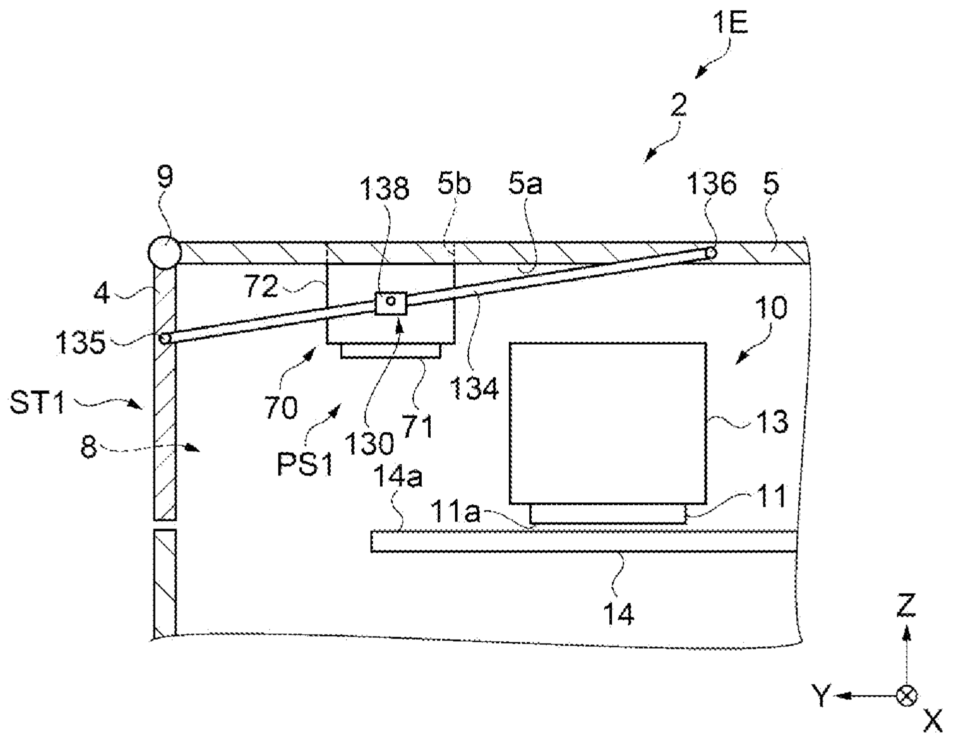
FIG. 10A is a schematic view illustrating a partial configuration of a recording device according to a sixth embodiment.

As illustrated in FIG. 10A, a recording device 1E according to this embodiment includes the head 11 that can perform recording on the medium M, the housing unit 5 that houses the head 11 and includes the opening 8 through which the head 11 is visible, the opening/closing cover 4 that can open and close the opening 8, and a movement mechanism 130 provided at the predetermined position PS1 above the head 11 and capable of moving the illumination unit 70 to the retracted position PS2 farther away from the head 11 than the predetermined position PS1 is.

Note that the configurations of the head 11, the housing unit 5, and the illumination unit 70 are the same as those of the first embodiment.

Figure 10B:
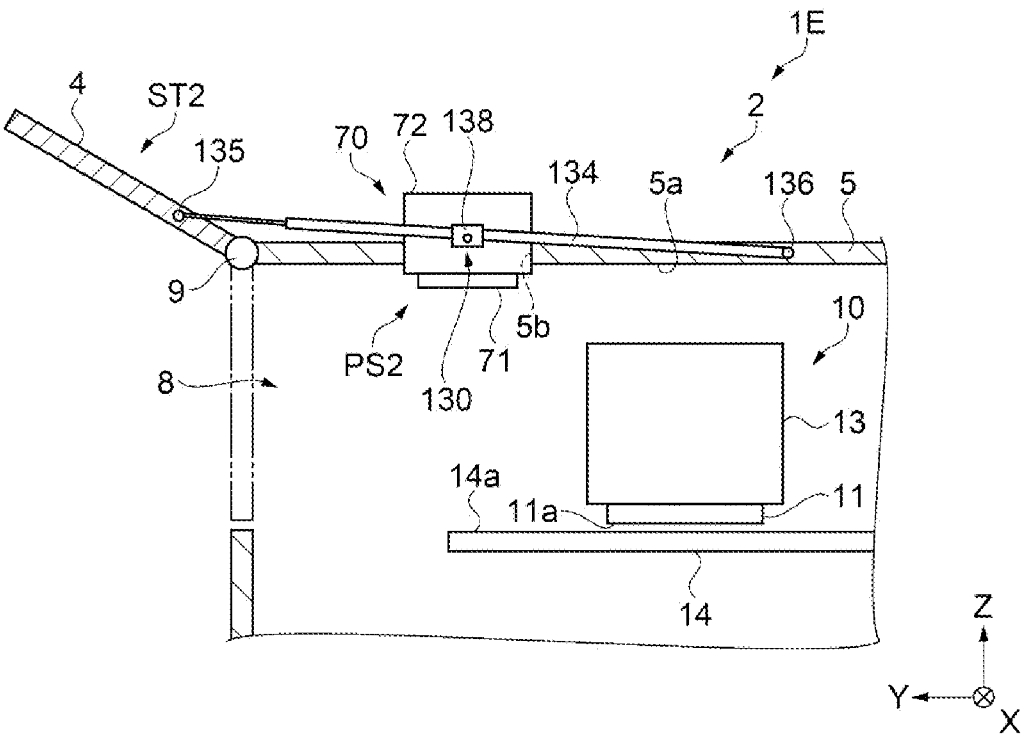
FIG. 10B is a schematic view illustrating an operation method for the recording device according to the sixth embodiment.

The illumination unit 70 of the recording device 1E according to this embodiment can move to the retracted position PS2 farther away from the head 11 than the predetermined position PS1 is, in response to the opening/closing cover 4 being opened. When the opening/closing cover 4 is in the closed state ST1, the illumination unit 70 is located at the predetermined position PS1 (FIG. 10A). On the other hand, when the opening/closing cover 4 is in the closed state ST2, the illumination unit 70 is located at the retracted position PS2 (FIG. 10B). The definition of the predetermined position PS1 is the same as that of the first embodiment.

Figure 10C:
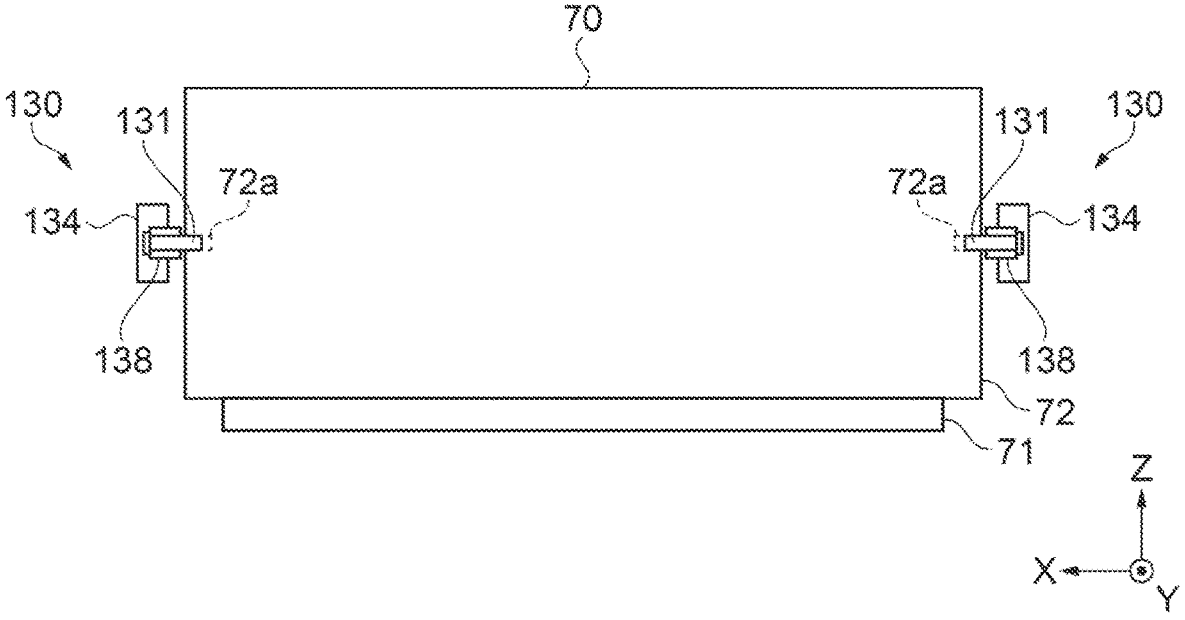
FIG. 10C is a schematic view illustrating a partial configuration of the recording device according to the sixth embodiment.
Figure 10D:
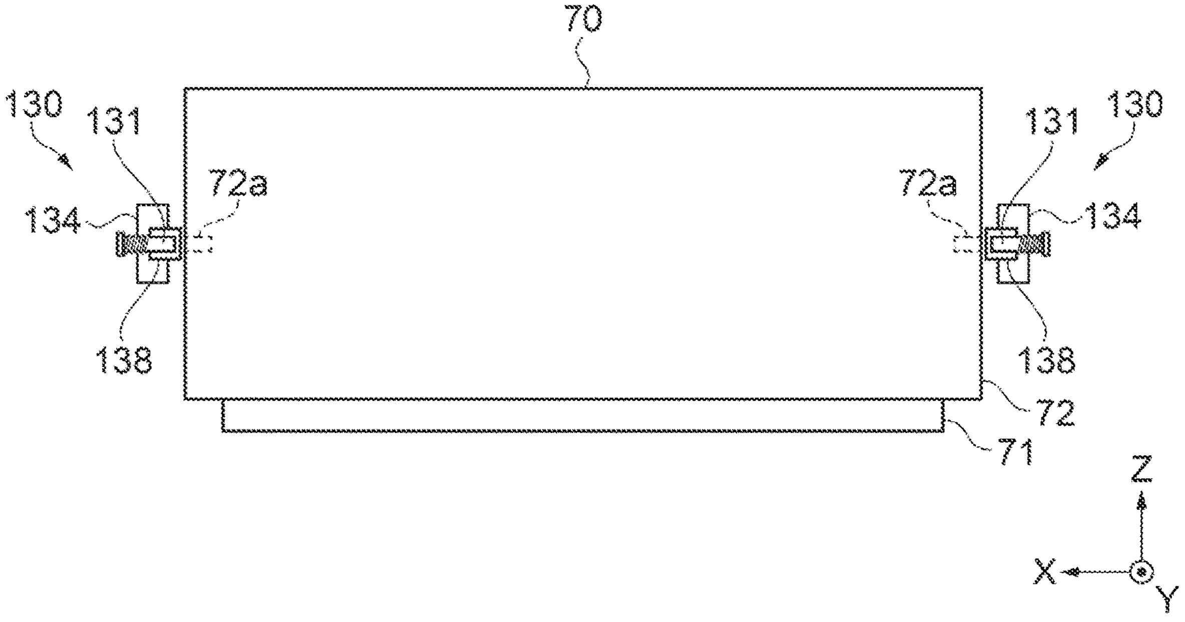
FIG. 10D is a schematic view illustrating a partial configuration of the recording device according to the sixth embodiment.

The recording device 1E according to this embodiment is configured such that the illumination unit 70 can be displaced between the predetermined position PS1 and the retracted position PS2 in conjunction with the opening/closing operation of the opening/closing cover 4, using the movement mechanism 130. Specifically, as illustrated in FIG. 10C and FIG. 10D, solenoids 138 each including a first shaft 131 are provided so as to face the end surface in the positive X direction and the end surface in the negative X direction of the support body 72 of the illumination unit 70, respectively. The solenoid 138 is an electrical component capable of moving the first shaft 131 along the X-axis in response to an electrical signal.

The first shaft 131 extends in the direction along the X-axis. The first shaft 131 is disposed in the central portion in the direction along the Y-axis of the support body 72. Further, the support body 72 is provided with recessed portions 72*a* extending in the direction along the X-axis so as to correspond to the first shafts 131.

By turning on/off the current to the solenoid 138, the first shaft 131 can be moved in the direction along the X-axis, and the first shaft 131 can be coupled to and separated from the illumination unit 70. Specifically, when the first shaft 131 protrudes and is inserted into the recessed portion 72*a*, the first shaft 131 is coupled to the illumination unit 70. On the other hand, when the first shaft 131 is pulled out from the recessed portion 72*a*, the first shaft 131 is separated from the illumination unit 70. Note that, in this embodiment, the illumination unit 70 is supported from below by the rib provided inside the housing unit 5.

The recording device 1E includes rod-like link members 134 each coupling the solenoid 138, the housing unit 5, and the opening/closing cover 4. One end of the link member 134 is coupled to the opening/closing cover 4. The one end of the link member 134 is coupled to a cover-side shaft 135 provided on the opening/closing cover 4 side. The other end of the link member 134 is coupled to the upper portion of the housing unit 5. The other end of the link member 134 is rotatable about a housing unit-side shaft 136 provided at the upper portion of the housing unit 5. The cover-side shaft 135 and the housing unit-side shaft 136 extend in the direction along the X-axis.

In the state in which the opening/closing cover 4 is in the closed state ST1 and the illumination unit 70 is located at the predetermined position PS1, the link member 134 is disposed so as to be oriented upward from the cover-side shaft 135 toward the housing unit-side shaft 136. The cover-side shaft 135, the solenoid 138 (first shaft 131), and the housing unit-side shaft 136 are disposed in this order from the lower side to the upper side. Note that the one end of the link member 134 coupled to the cover-side shaft 135 is provided with a damper mechanism.

Further, the opening portion 5*b* is formed in a portion, of the housing unit 5, above the illumination unit 70, the solenoids 138, and the link members 134.

Figure 10E:
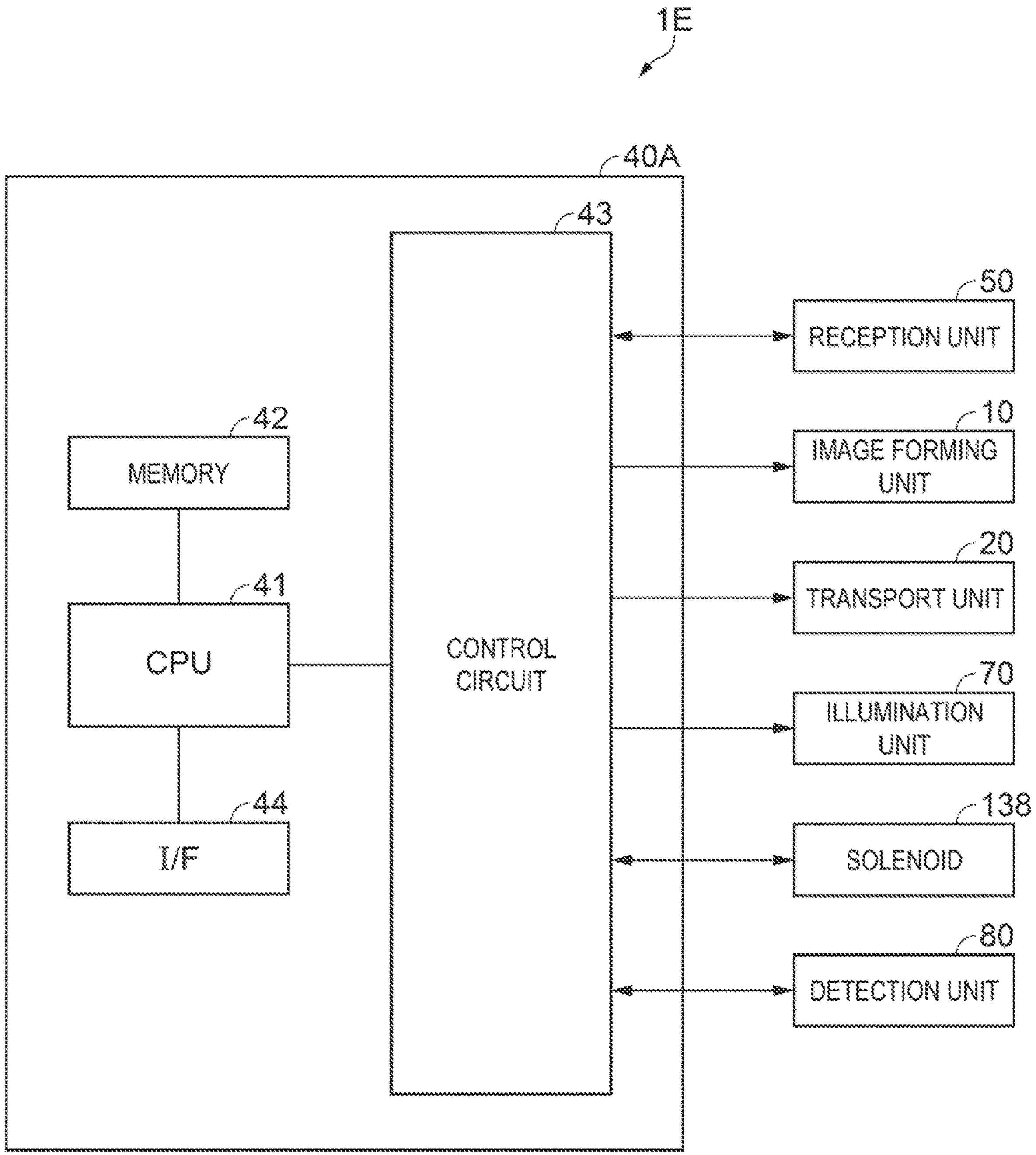
FIG. 10E is a block diagram illustrating a control configuration of the recording device according to the sixth embodiment.

As illustrated in FIG. 10E, the recording device 1E includes a control unit 40A that controls various operations performed by the recording device 1E. The control unit 40A includes, for example, the CPU 41, the memory 42, the control circuit 43, the interface (I/F) 44, and the like.

The control unit 40A according to this embodiment can selectively control, based on the input from the reception unit 50, a first mode in which the illumination unit 70 is moved from the predetermined position PS1 to the retracted position PS2 in response to the opening/closing cover 4 being opened, and a second mode in which the illumination unit 70 is not moved from the predetermined position PS1 in response to the opening/closing cover 4 being opened The selection between the first mode and the second mode can be performed by controlling the solenoids 138 constituting the movement mechanism 130.

Next, a control method for the recording device 1E will be described. Specifically, a method for controlling the solenoids 138 in the first mode and the second mode will be described.

Figure 10F:
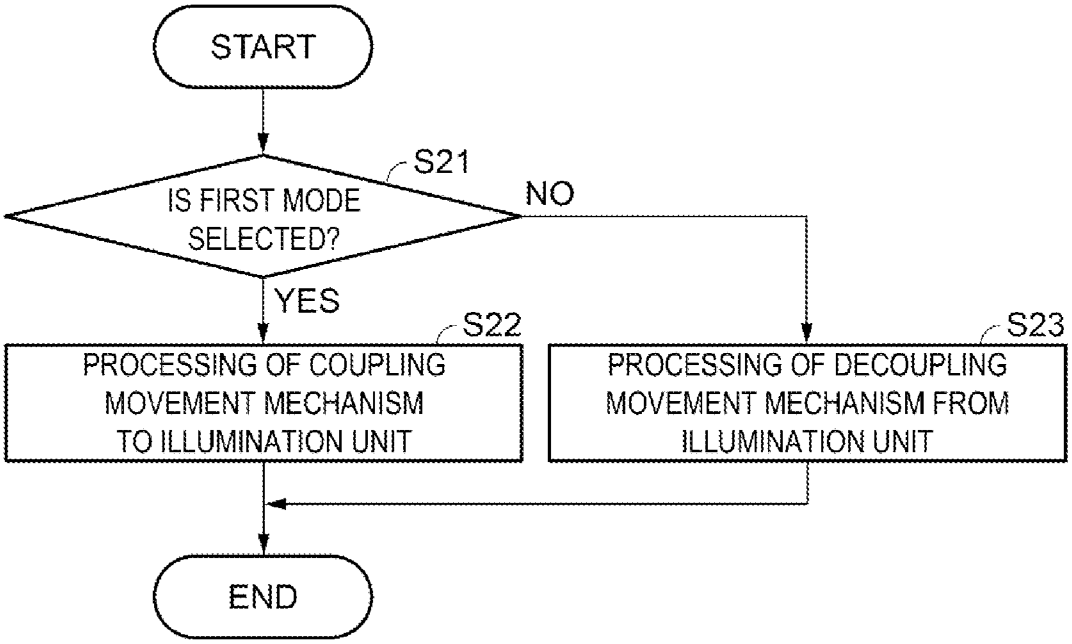
FIG. 10F is a flowchart illustrating a control method for the recording device according to the sixth embodiment.

As illustrated in FIG. 10F, at step S21, the control unit 40A determines whether or not the first mode is selected. Specifically, the control unit 40A determines whether or not the first mode is selected based on input information input by the user via the reception unit 50.

Then, when the control unit 40A determines that the first mode is selected (YES), the control unit 40A proceeds to step S22. On the other hand, when the control unit 40A determines that the first mode is not selected (NO), namely, the second mode is selected, the control unit 40A proceeds to step S23.

When the control unit 40A proceeds to step S22, the control unit 40A couples the movement mechanism 130 to the illumination unit 70. Specifically, as illustrated in FIG. 10C, in response to a drive signal, the first shaft 131 is caused to protrude, and the first shaft 131 is inserted into the recessed portion 72*a* of the support body 72. As a result, the movement mechanism 130 and the illumination unit 70 are coupled to each other.

After that, by moving the end portion in the negative Z direction of the opening/closing cover 4 toward the positive Y direction side, the opening/closing cover 4 is rotated about the shaft 9 and is opened. In conjunction with the opening/closing cover 4 being opened, the cover-side shaft 135 moves upward in the clockwise direction centered about the shaft 9. The link member 134 rotates about the housing unit-side shaft 136. The first shaft 131 moves upward in conjunction with the upward movement of the link member 134 in a state of supporting the support body 72. As a result, the illumination unit 70 moves upward. Then, as illustrated in FIG. 10B, when the opening/closing cover 4 transitions to the open state ST2, the illumination unit 70 is located at the retracted position PS2. The retracted position PS2 is a position located further away from the head 11 than the predetermined position PS1. In this embodiment, the retracted position PS2 is the position in the positive Z direction with respect to the predetermined position PS1. The illumination unit 70 moves in a direction substantially along the Z-axis.

Note that, in this embodiment, the illumination unit 70 moves in synchronization with the opening operation of the opening/closing cover 4.

Further, the illumination unit 70 moves such that, as well as facing the platen 14 at the predetermined position PS1, the illumination unit 70 faces the platen 14 at the retracted position PS2. Although, at the retracted position PS2, the illumination unit 70 is located at the position further away, the light is irradiated from the illumination unit 70 toward the platen 14, and thus a significant reduction, in the vicinity of the head 11, in the amount of light from the illumination unit 70 is suppressed.

On the other hand, when the control unit 40A proceeds to step S23, the control unit 40A separates the movement mechanism 130 from the illumination unit 70. Specifically, as illustrated in FIG. 10D, in response to the drive signal, the first shaft 131 is retracted from the recessed portion 72*a*. As a result, the movement mechanism 130 and the illumination unit 70 are brought into a separated state (decoupled state).

Figure 10G:
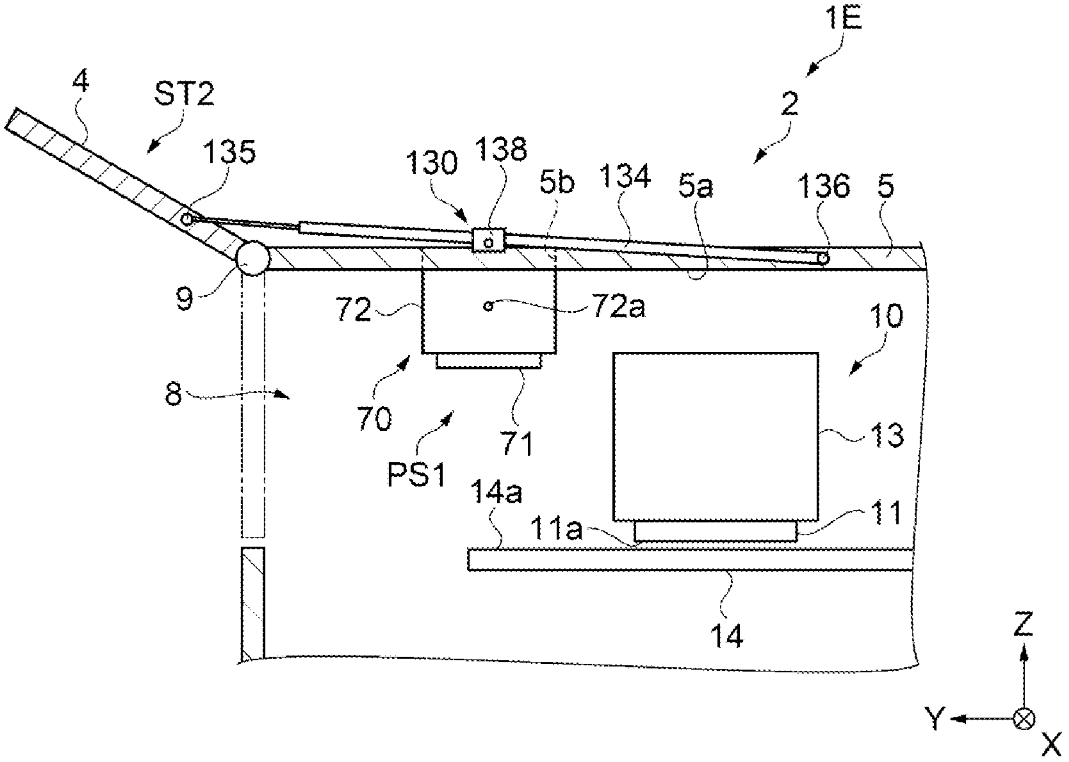
FIG. 10G is a schematic view illustrating the operation method for the recording device according to the sixth embodiment.

After that, by moving the end portion in the negative Z direction of the opening/closing cover 4 toward the positive Y direction side, the opening/closing cover 4 is rotated about the shaft 9 and opened. In conjunction with the opening/closing cover 4 being opened, the link member 134 moves upward. Then, as illustrated in FIG. 10G, even when the opening/closing cover 4 transitions to the open state ST2, the illumination unit 70 is maintained at the predetermined position PS1 since the illumination unit 70 is separated from the link members 134.

As described above, according to this embodiment, the user can select a desired way of usage, and thus convenience for the user is improved. Specifically, by selecting the first mode, the illumination unit 70 is retracted with respect to the head 11. Thus, the interference between the head 11 and the like and the illumination unit 70 is suppressed, and a deterioration in the workability during the maintenance or the like can be suppressed. Further, when the user wants to view the state of the image formed on the medium M, by the user selecting the second mode, the illumination unit 70 is not retracted even when the opening/closing cover 4 is opened. Thus, a burden on the user is reduced.

Note that although the solenoids 138 are used in the movement mechanism 130 of this embodiment, the configuration is not limited to this example. For example, mechanical elements, such as various link mechanisms, gear mechanisms, and belt mechanisms, may be used. Further, electromechanical elements, such as motors and ball screws, may be used. Furthermore, these mechanical and electromechanical elements may be applied in combination.

Further, similarly to the first embodiment, the control of the illumination unit 70 associated with the operation of the opening/closing cover 4 may be performed.

7. Other Embodiments

The opening/closing cover 4 of the embodiment described above has a configuration in which the user manually performs the opening/closing operation using a mechanical mechanism, but the configuration is not limited to this example. The opening/closing operation of the opening/closing cover 4 may be electrically performed in an automatic manner.

In the embodiment described above, an example is described in which the illustration unit 70 is used as the disposed object (object to be retracted) that is moved from the predetermined position PS1 to the retracted position PS2, but the configuration is not limited to this example. For example, a fan unit or the like may be used as the disposed object. The fan unit includes a blade and a cover that houses the blade, and generates an air stream. Even with this configuration, similar advantages as described above can be obtained.

In the embodiment described above, the transport unit 20 includes the medium supply/return unit 21, the roll body storage unit 22, the discharge unit 23, and the like, but the configuration is not limited to this example. For example, the transport unit may include a first roller, a second roller, and a transporting belt stretched over the first roller and the second roller. At least one of the first roller and the second roller is a driving roller to which power is transmitted from a drive source such as a motor. When the transport unit includes the transporting belt, the transporting belt also functions as a support portion. A surface, of the outer peripheral surface of the transporting belt, on which the medium M is supported corresponds to a support surface.

Contents derived from the embodiment will be described below.

A recording device includes a recording unit configured to perform recording on a medium, a housing unit configured to house the recording unit and including an opening through which the recording unit is visible, an opening/closing cover configured to open and close the opening, and an illumination unit provided at a predetermined position above the recording unit and configured to illuminate an interior of the housing unit. The illumination unit is configured to move to a retracted position farther away from the recording unit than is the predetermined position, in response to the opening/closing cover being opened.

According to this configuration, the illumination unit can move in a direction away from the recording unit in response to (in conjunction with) the opening/closing cover being opened. In this way, the interference between a member (such as the head) removed from the recording unit and the illumination unit can be suppressed, and a deterioration in the workability can thus be suppressed.

When the recording unit is removed from and attached to the interior of the housing unit, it is not necessary to move the recording unit to a position at which the recording unit does not interfere with the illumination unit, and the work efficiency is thus improved.

The recording device preferably includes a control unit configured to control the recording unit and the illumination unit, and when the opening/closing cover is opened, the control unit preferably stops an operation of the recording unit and causes the illumination unit to operate.

According to this configuration, when the opening/closing cover is opened, the control unit stops the operation of the recording unit and causes the illumination unit to continue to operate. In this way, a deterioration in the workability of the maintenance with respect to the recording unit, which is caused by the continuing operation of the recording unit, can be suppressed, and at the same time, illumination light from the illumination unit can be utilized as illumination light during the maintenance operation.

The control unit of the recording device preferably increases an output of the illumination unit when the illumination unit moves in response to the opening/closing cover being opened.

According to this configuration, a reduction in the amount of light caused by the illumination unit moving in the direction away from the recording unit can be suppressed.

The recording device according to claim 1 preferably includes a support portion facing the recording unit and the illumination unit at the predetermined position and configured to support the medium. The illumination unit preferably moves to both face the support portion at the predetermined position and face the support portion at the retracted position.

According to this configuration, a significant reduction, in the vicinity of the recording unit, in the amount of light from the illumination unit is suppressed.

A recording device includes a recording unit configured to perform recording on a medium, a housing unit configured to house the recording unit and including an opening through which the recording unit is visible, an opening/closing cover configured to open and close the opening, an illumination unit provided at a predetermined position above the recording unit and configured to illuminate an interior of the housing unit, a movement mechanism configured to move the illumination unit to a retracted position farther away from the recording unit than is the predetermined position, a reception unit configured to receive an input from a user, and a control unit configured to control the movement mechanism. The control unit is configured to, based on the input, selectively control a first mode in which the illumination unit is moved from the predetermined position to the retracted position in response to the opening/closing cover being opened, and a second mode in which the illumination unit is not moved from the predetermined position in response to the opening/closing cover being opened.

According to this configuration, an appropriate usage can be selected in accordance with a user's preference, and convenience for the user is improved.

What is claimed is:

1. A recording device comprising:

a recording unit configured to perform recording on a medium;

a housing unit configured to house the recording unit and including an opening through which the recording unit is visible;

an opening/closing cover configured to open and close the opening; and an illumination unit connected to the opening/closing cover for relative movement therewith and provided at a predetermined position above the recording unit and configured to illuminate an interior of the housing unit, wherein the illumination unit is configured to move to a retracted position farther away from the recording unit than is the predetermined position, in response to the opening/closing cover being opened, wherein, the illumination unit is configured to move relative to the opening/closing cover when the illumination unit moves to the retracted position.

2. The recording device according to claim 1, comprising a control unit configured to control the recording unit and the illumination unit, wherein when the opening/closing cover is opened, the control unit stops an operation of the recording unit and causes the illumination unit to operate.

3. The recording device according to claim 2, wherein the control unit increases an output of the illumination unit when the illumination unit moves in response to the opening/closing cover being opened.

4. The recording device according to claim 1, comprising a support portion facing the recording unit and the illumination unit at the predetermined position and configured to support the medium, wherein the illumination unit moves to face the support portion at the predetermined position and also face the support portion at the retracted position.

5. A recording device comprising:

a recording unit configured to perform recording on a medium;

a housing unit configured to house the recording unit and including an opening through which the recording unit is visible;

an opening/closing cover configured to open and close the opening;

an illumination unit provided at a predetermined position above the recording unit and configured to illuminate an interior of the housing unit;

a movement mechanism configured to move the illumination unit to a retracted position farther away from the recording unit than is the predetermined position;

a reception unit configured to receive an input from a user; and a control unit configured to control the movement mechanism, wherein the control unit is configured to, based on the input, selectively control a first mode in which the illumination unit is moved from the predetermined position to the retracted position in response to the opening/closing cover being opened, and a second mode in which the illumination unit is not moved from the predetermined position in response to the opening/closing cover being opened.

* * * * *